(12) United States Patent
Yaghi et al.

(10) Patent No.: US 8,876,953 B2
(45) Date of Patent: Nov. 4, 2014

(54) CARBON DIOXIDE CAPTURE AND STORAGE USING OPEN FRAMEWORKS

(75) Inventors: Omar M. Yaghi, Los Angeles, CA (US); David Kyle Britt, Los Angeles, CA (US); Bo Wang, Beijing (CN)

(73) Assignee: The Regents of the University of California, Oakland, CA (US)

( * ) Notice: Subject to any disclaimer, the term of this patent is extended or adjusted under 35 U.S.C. 154(b) by 203 days.

(21) Appl. No.: 13/377,805

(22) PCT Filed: Jun. 18, 2010

(86) PCT No.: PCT/US2010/039123
§ 371 (c)(1),
(2), (4) Date: Feb. 21, 2012

(87) PCT Pub. No.: WO2010/148276
PCT Pub. Date: Dec. 23, 2010

(65) Prior Publication Data
US 2012/0133939 A1    May 31, 2012

Related U.S. Application Data

(60) Provisional application No. 61/218,884, filed on Jun. 19, 2009.

(51) Int. Cl.
| | | |
|---|---|---|
| B01D 53/02 | (2006.01) | |
| B01J 20/26 | (2006.01) | |
| B01J 20/22 | (2006.01) | |
| B01J 20/34 | (2006.01) | |

(52) U.S. Cl.
CPC ........ *B01D 53/02* (2013.01); *B01D 2259/4541* (2013.01); *B01J 2220/56* (2013.01); *B01J 20/226* (2013.01); *B01J 20/3458* (2013.01); *Y02C 10/04* (2013.01); *B01D 2257/504* (2013.01); *Y02C 10/08* (2013.01); *B01D 2253/204* (2013.01); *B01D 2258/06* (2013.01); *Y10S 95/90* (2013.01)
USPC ............................... 95/139; 95/900; 502/401

(58) Field of Classification Search
CPC .. B01D 53/02; B01D 53/04; B01D 2253/204; B01D 2257/504; B01D 2258/06; B01D 2259/454; B01J 20/226; B01J 2220/56; B01J 20/3458; Y02C 10/04; Y02C 10/08
USPC ............. 356/402; 96/108, 117.5, 132; 95/90, 95/139, 900; 206/0.7; 502/401; 423/230
See application file for complete search history.

(56) References Cited

U.S. PATENT DOCUMENTS

| | | | |
|---|---|---|---|
| 2,684,967 A | 7/1954 | Berg | |
| 4,532,225 A | 7/1985 | Tsao et al. | |

(Continued)

FOREIGN PATENT DOCUMENTS

| | | |
|---|---|---|
| DE | 102005023856 A1 | 11/2006 |
| DE | 102005054523 A1 | 5/2007 |

(Continued)

OTHER PUBLICATIONS

Caskey et al., "Dramatic Tuning of CO2 uptake via Metal Substitution in a Coordination Polymer with Cylindrical Pores," JACS, 2008, pp. 10870-10871.

(Continued)

*Primary Examiner* — Frank Lawrence
(74) *Attorney, Agent, or Firm* — Gavrilovich, Dodd & Lindsey LLP; Joseph R. Baker, Jr.

(57) ABSTRACT

Methods and compositions useful for gas storage and separation are provided. More particularly, compositions and methods for $CO_2$ storage and separation are provided comprising an open metal organic framework.

14 Claims, 4 Drawing Sheets

(56) References Cited

U.S. PATENT DOCUMENTS

| | | | |
|---|---|---|---|
| 5,064,804 A | 11/1991 | Soo et al. | |
| 5,160,500 A | 11/1992 | Chu et al. | |
| 5,208,335 A | 5/1993 | Ramprasad et al. | |
| 5,648,508 A | 7/1997 | Yaghi | |
| 5,733,505 A | 3/1998 | Goldstein et al. | |
| 6,479,447 B2 | 11/2002 | Bijl et al. | |
| 6,501,000 B1 | 12/2002 | Stilbrany et al. | |
| 6,617,467 B1 | 9/2003 | Muller et al. | |
| 6,624,318 B1 | 9/2003 | Mueller et al. | |
| 6,893,564 B2 | 5/2005 | Mueller et al. | |
| 6,929,679 B2 | 8/2005 | Mueller et al. | |
| 6,930,193 B2 | 8/2005 | Yaghi et al. | |
| 7,196,210 B2 | 3/2007 | Yaghi et al. | |
| 7,202,385 B2 | 4/2007 | Mueller et al. | |
| 7,279,517 B2 | 10/2007 | Mueller et al. | |
| 7,309,380 B2 | 12/2007 | Mueller et al. | |
| 7,343,747 B2 | 3/2008 | Mueller et al. | |
| 7,411,081 B2 | 8/2008 | Mueller et al. | |
| 7,524,444 B2 | 4/2009 | Hesse et al. | |
| 7,582,798 B2 | 9/2009 | Yaghi et al. | |
| 7,637,983 B1 | 12/2009 | Liu et al. | |
| 7,652,132 B2 | 1/2010 | Yaghi et al. | |
| 7,662,746 B2 | 2/2010 | Yaghi et al. | |
| 7,799,120 B2 | 9/2010 | Yaghi et al. | |
| 7,815,716 B2 | 10/2010 | Mueller et al. | |
| 2003/0004364 A1 | 1/2003 | Yaghi et al. | |
| 2003/0078311 A1 | 4/2003 | Muller et al. | |
| 2003/0148165 A1 | 8/2003 | Muller et al. | |
| 2003/0222023 A1 | 12/2003 | Mueller et al. | |
| 2004/0081611 A1 | 4/2004 | Muller et al. | |
| 2004/0225134 A1 | 11/2004 | Yaghi et al. | |
| 2004/0249189 A1 | 12/2004 | Mueller et al. | |
| 2004/0265670 A1 | 12/2004 | Muller et al. | |
| 2005/0004404 A1 | 1/2005 | Muller et al. | |
| 2005/0014371 A1 | 1/2005 | Tsapatsis et al. | |
| 2005/0124819 A1 | 6/2005 | Yaghi et al. | |
| 2005/0154222 A1 | 7/2005 | Muller et al. | |
| 2005/0192175 A1 | 9/2005 | Yaghi et al. | |
| 2006/0057057 A1 | 3/2006 | Muller et al. | |
| 2006/0135824 A1 | 6/2006 | Mueller et al. | |
| 2006/0154807 A1 | 7/2006 | Yaghi et al. | |
| 2006/0185388 A1 | 8/2006 | Muller et al. | |
| 2006/0252641 A1 | 11/2006 | Yaghi et al. | |
| 2006/0252972 A1 | 11/2006 | Pilliod et al. | |
| 2006/0287190 A1 | 12/2006 | Eddaoudi et al. | |
| 2007/0068389 A1 | 3/2007 | Yaghi | |
| 2007/0202038 A1 | 8/2007 | Yaghi et al. | |
| 2007/0217982 A1* | 9/2007 | Wright et al. | 423/230 |
| 2007/0248575 A1 | 10/2007 | Conner et al. | |
| 2008/0017036 A1 | 1/2008 | Schultink et al. | |
| 2008/0184883 A1 | 8/2008 | Zhou et al. | |
| 2008/0190289 A1* | 8/2008 | Muller et al. | 95/25 |
| 2009/0155588 A1 | 6/2009 | Hesse et al. | |
| 2010/0132549 A1 | 6/2010 | Yaghi et al. | |
| 2010/0143693 A1 | 6/2010 | Yaghi et al. | |
| 2010/0186588 A1 | 7/2010 | Yaghi et al. | |
| 2010/0286022 A1 | 11/2010 | Yaghi et al. | |
| 2011/0137025 A1 | 6/2011 | Yaghi et al. | |
| 2012/0031268 A1* | 2/2012 | Yaghi et al. | 95/96 |

FOREIGN PATENT DOCUMENTS

| | | | |
|---|---|---|---|
| EP | 1674555 A1 | 6/2006 | |
| WO | 2004101575 A2 | 11/2004 | |
| WO | 2006047423 A2 | 5/2006 | |
| WO | 2006072573 A2 | 7/2006 | |
| WO | 2006116340 A1 | 11/2006 | |
| WO | 2007101241 A2 | 9/2007 | |
| WO | 2007111739 A2 | 10/2007 | |
| WO | 2008091976 A1 | 7/2008 | |
| WO | 2008138989 A1 | 11/2008 | |
| WO | 2008140788 A1 | 11/2008 | |
| WO | 2009020745 A9 | 2/2009 | |
| WO | 2009042802 A1 | 4/2009 | |
| WO | 2009056184 A1 | 5/2009 | |
| WO | WO 2009/073739 A1 * | 6/2009 | |
| WO | 2009149381 A3 | 12/2009 | |
| WO | 2010056092 A9 | 5/2010 | |
| WO | 2010078337 A1 | 7/2010 | |
| WO | 2010080618 A1 | 7/2010 | |
| WO | 2010083418 A1 | 7/2010 | |
| WO | 2010088629 A1 | 8/2010 | |
| WO | 2010090683 A1 | 8/2010 | |
| WO | 2010148276 A3 | 12/2010 | |
| WO | 2010148296 A3 | 12/2010 | |
| WO | 2010148374 A3 | 12/2010 | |
| WO | 2011014503 A1 | 2/2011 | |
| WO | 2011038208 A2 | 3/2011 | |
| WO | 2011146155 A9 | 11/2011 | |
| WO | 2012012495 A3 | 1/2012 | |
| WO | 2012082213 A2 | 6/2012 | |
| WO | 2012100224 A3 | 7/2012 | |
| WO | 2012106451 A2 | 8/2012 | |

OTHER PUBLICATIONS

Park, Jae Woo, International Search Report and Written Opinion, PCT/US2010/039123, Korean Intellectual Property Office, Feb. 24, 2011.

Llabres et al., "MOFs as catalysts: Activity, reusability and shape-selectivity of a Pd-containing MOF," JOurnal of Catalysis 250(2):294-298.

Loeb, SJ, "Rotaxanes as ligands: from molecules to materials" Chemical Society reviews, 2007, 36, pp. 226-235.

Long et al., "The Pervasive Chemistry of Metal-Organic Frameworks," Chem. Soc. Rev. 38:1213-1214 (2009).

Lu et al., "Synthesis and Structure of Chemically Stable Metal-Organic Polyhedra," J. Am. Chem. Soc. 131:(35) 12532-12533 (2009).

Mendoza-Cortes et al., "Adsorption Mechanism and Uptake of Methane in Covalent Organic Frameworks: Theory and Experiment," J. Phys. Chem. 114:10824-10833 (2010).

Michalitsch, Richard. International Search Report and Written Opinion for PCT/US2009/069700. Date of Mailing: May 7, 2010.

Millward et al., "Metal-Organic Frameworks with Exceptionally High Capacity for Storage of Carbon Dioxide at Room Temperature," J. Am. Chem. Soc. 127:17998-17999 (2005).

Morris et al., "Crystals as Molecules: Postsynthesis Covalent Functionalization of Zeolitic Imidazolate Frameworks," J. Am. Chem. Soc. 130:12626-12627 (2008).

Morris et al., "A Combined Experimental—Computational Investigation of Carbon Dioxide Capture in a Series of Isoreticular Zeolitic Imidazolate Frameworks," J. Am. Chem. Soc. 132:11006-11008 (2010).

Morris et al., "Postsynthetic Modification of a Metal-Organic Framework for Stabilization of a Hemiaminal and Ammonia Uptake," Inorg. Chem. 50:6853-6855 (2011).

Moyse, Ellen, International Preliminary Report on Patentability and Written Opinion, Date of Issuance of Report: Nov. 17, 2009, International Application No. PCT/US08/006008.

Mulhausen, Dorothee. International Preliminary Report on Patentability for PCT/US2009/069700. Date of Mailing: Jul. 7, 2011.

Mulhausen, Dorothee. International Preliminary Report on Patentability for PCT/US2010/021201. Date of Mailing Jul. 28, 2011.

Ni et al., "Porous Metal-Organic Truncated Octahedron Constructed from Paddle-Wheel Squares and Terthiophene Links," J. Am. Chem. Soc. 127:12752-12753 (2005).

Nickitas-Etienne, Athina, International Preliminary Report on Patentability and Written Opinion, Date of Issuance of Report: Jan. 19, 2010, International Application No. PCT/US08/70149.

Nickitas-Etienne, Athina. International Preliminary Report on Patentability for PCT/US2008/07741. Date of issuance of this report: Mar. 30, 2010.

Nickitas-Etienne, Athina. International Preliminary Report on Patentability for PCT/US2009/068849. Date of Mailing: Jun. 30, 2011.

Niu et al., "Synthesis and structural characterization of the one dimensional polymers [Rh2(OAc)4(NCPhCN)]S, S=CH3COCH3, CH3OH, C2H5OH, C4H8O, and C6H6," Polyhedron 17(23-24):4079-89 (1998).

(56) References Cited

OTHER PUBLICATIONS

Novoa, Carlos, International Search Report and Written Opinion for PCT/US2010/021201, European Patent Office. Date of Mailing: Apr. 27, 2010.

Oisaki et al., "A Metal-Organic Framework with Covalently Bound Organometallic Complexes," J. Am. Chem. Soc. 132:9262-9264 (2010).

O'Keeffe et al., "Structural Study of New Hydrocarbon Nano-Crystals by Energy-Filtered Electron Diffraction," Ultramicroscopy 98:145-150 (2004).

O'Keeffe et al., "Germanate Zeolites: Contrasting the Behavior of Germanate and Silicate Structures Built from Cubic T8O20 units (T=Si or Ge)," Chem. Eur. J. 5:2796-2801 (1999).

O'Keeffe et al., "Frameworks for Extended Solids: Geometrical Design Principles," J. Solid State Chem. 152:3-20 (2000).

Okeefffe et al., "Reticular Chemistry—Present and Future Prospects—Introduction,"J. Solid State Chem.178:V-VI (2005).

O'Keeffe et al., "The Reticular Chemistry Structure Resource (RCSR) Database of, and Symbols for, Crystal Nets," Acc. Chem. Res. 41:1782-1789 (2008).

Park, Kyo Sung et al., "Exceptional chemical and thermal stability of zeolitic imidazolate frameworks," Proc. Natl. Acad. Sci., Jul. 5, 2006, pp. 10186-10191, vol. 103, No. 27.

Patteux, Claudine. International Search Report for PCT/US2010/043373. Date of Mailing: Oct. 10, 2010.

Pawsey et al., "Hyperpolarized 129Xe Nuclear Magnetic Resonance Studies of Isoreticular Metal-Organic Frameworks," Phys. Chem. 111:6060-6067 (2007).

Phan et al., "Synthesis, Structure, and Carbon Dioxide Capture Properties of Zeolitic Imidazolate Frameworks," Acc. Chem. Res 43:58-67 (2009).

Phan et al., "Metal-Organic Frameworks of Vanadium as Catalysts for Conversion of Methane to Acetic Acid," Inorg. Chem. 50:7388-7390 (2011).

Plevert et al., "A Flexible Germanate Structure Containing 24-Ring Channels With Very Low Framework Density," J. Am. Chem. Soc. 123:12706-12707 (2001).

Plevert et al., "Synthesis and Characterization of Zirconogermanates," Inorg. Chem., 42:5954-5959 (2003).

Plevert et al., "Layered Structures Constructed from New Linkages of Ge7(O,OH,F)19 Clusters," Chem. Mater. 15:714-718 (2003).

Reineke et al., "From Condensed Lanthanide Coordination Solids to Microporous Frameworks Having Accessible Metal Sites," J. Am. Chem. Soc 121:1651-1657 (1999).

Reineke et al., "A Microporosity of Lanthanide-Organic Frameworks," Angew. Chem. Int. Ed. 38:2590-2594 (1999).

Reineke et al., "Large Free Volume in Interpenetrating Networks: The Role of Secondary Building Units Exemplified by Tb2(ADB)3[(CH3)2SO]4-16[(CH3)2SO]," J. Am. Chem. Soc. 122:4843-4844 (2000); Featured in Science Magazine, Editors Choice (Nov. 2000).

Rosi et al., "Infinite Secondary Building Units and Forbidden Catenation in Metal-Organic Frameworks," Angew. Chem. Int. Ed. 41:294-297 (2002).

Rosi et al., "Advances in the Chemistry of Metal-Organic Frameworks," CrystEngComm 4:401-404 (2002).

Rosi et al., "Hydrogen Storage in Microporous Metal-Organic Frameworks," Science 300:1127-1129 (2003); Featured in (1) Chemical & Engineering News magazine, May 19, 2004, and (2) Technology Research News Magazine, May 21, 2003.

Rosi et al., "Rod-Packings and Metal-Organic Frameworks Constructed from Rod-Shaped Secondary Building Units," J. Am. Chem. Soc. 127:1504-1518 (2005).

Rowsell et al., "Hydrogen Sorption in Functionalized Metal-Organic Frameworks," J. Am. Chem. Soc.126: 5666-5667 (2004).

Rowsell et al., "Metal-Organic Frameworks: A New Class of Porous Materials," Microporous Mesoporous Mater. 73:3-14 (2004).

Rowsell et al., "Strategies for Hydrogen Storage in Metal-Organic Frameworks," Angew. Chem. Int. Ed. 44: 4670-4679 (2005).

Rowsell et al., "Gas Adsorption Sites in a Large-Pore Metal-Organic Framework," Science 309:1350-1354 (2005).

Rowsell et al., "Characterization of H2 Binding sites in prototypical metal-organic frameworks by inelastic neutron scattering," J. Am. Chem. Soc. 127:14904-14910 (2005).

Rowsell et al., "Effects of Functionalization, Catenation, and Variation of the Metal Oxide and Organic Linking Units on the Low-Pressure Hydrogen Adsorption Properties of Metal-Organic Frameworks," J. Am. Chem. Soc. 128: 1304-1315 (2006).

Siberio-Perez, "Raman Spectroscopic Investigation of CH4 and N2 Adsorption in Metal-Organic Frameworks," Chem. Mater. 19:3681-3685 (2007).

Smaldone et al., "Metal-Organic Frameworks from Edible Nature Products," Angew. Chem. Int. Ed. 49:8630-8634 (2010).

Spencer et al., "Determination of the Hydrogen Absorption Sites in Zn4O(1,4-benzenedicarboxylate) by Single Crystal Neutron Diffraction," Chem. Commun. 3:278-280 (2006); Epub Dec. 6, 2005.

Costa et al., "Chemical Modification of a Bridging Ligand Inside a Metal-Organic Framework while Maintaining the 3D Structure," Eur. J. Inorg. Chem. 10:1539-1545 (2008).

Cui et al., "IIn Situ Hydrothermal Growth of Metal-Organic Framework 199 Films on Stainless Steel Fibers for Solid-Phase Microextraction of Gaseous Benzene Homologues," Anal. Chem. 81(23):9771-9777 (2009).

Dugan et al., "Covalent modification of a metal-organic framework with isocyanates: probing substrate scope and reactivity," 29:3366-3368 (2008).

Feng et al., "Two new metal-triazole-benzenedicarboxylate frameworks affording an uncommon 3,4-connected net and unique 4,6-connected rod packing: hydrothermal synthesis, structure, thermostability and luminescence studies," CrystEngComm 11(6):1097-1102 (2009).

Galli et al., "Adsorption of Harmful Organic Vapors by Flexible Hydrophobic Bis-pyrazolate Based MOFs," Chem. Mater. 22(5):1664-1672 (2010).

Ingleson et al., "Framework fractionalization triggers metal complex binding," Chem. Comm. 23:2680-2682 (2008).

Li et al., "Synthesis and Structural Characterization of a New 3D Lead Coordination Polymer with a Tetrazole-1-acetate Ligand," Chinese J. Struct. Chem. 30(7):1049-1053 (2011).

Ling et al., "A zinc(II) metal-organic framework based on triazole and dicarboxylate ligands for selective adsorption of hexane isomers," Chem. Comm. 47:7197-7199 (2011).

Natarajan et al., "Non-carboxylate based metal-organic frameworks (MOFs) and related aspects," Current Opinion in Solid State and Materials Science 13(3-4):46-53 (2009).

Nickitas-Etienne, Athina, International Preliminary Report on Patentability for PCT/US2009/068731. Date of Issuance of the Report: Jun. 21, 2011.

Peterson et al., "Ammonia Vapor Removal by Cu3(BTC)2 and Its Characterization by MAS NMR," J. Phys. Chem. C. 113(32):13906-13917 (2009).

Seo et al., "A homochiral metal-organic porous material for enantioselective separation and catalysis," Nature 404:982-986 (2000).

Sigma-Aldrich, Basolite C300 (MOF-199), catalog No. 688614; http://www.sigmaaldrich.com/catalog/ProductDetail.do?D7=0&N5=SEARCH_CONCAT_PNO%7CBRAND_KEY&N4=688614%7CALDRICH&N25=0&QS=ON&F=SPEC.

Song et al., "Hydrothermal Synthesis and Structural Characterization of Three-dimensional Metal-organic Framework [Zn3(C2H2N3)2(C7H5O2)4]," Chem. Res. Chinese Universities 25(1):1-4 (2009).

Tanabe et al., "Systematic Functionalization of a Metal-Organic Framework via a Postsynthetic Modification Approach," J. Am. Chem. Soc. 130(26):8508-8517 (2008).

Vitillo et al., "Role of Exposed Metal Sites in Hydrogen Storage in MOFs," J. Am. Chem. Soc. 130(26):8386-8396 (2008).

Wang et al., "Postsynthetic Covalent Modification of a Neutral Metal-Organic Framework," J. Am. Chem. Soc. 129 (41):12368-12369 (2007).

Wang et al., "Tandem Modification of Metal-Organic Frameworks by a Postsynthetic Approach," Angew. Chem. Int. 47:4699-4702 (2008).

(56) References Cited

OTHER PUBLICATIONS

Yaghi, Omar., "Porous Crystals for Carbon Dioxide Storage," slide presentation at the Fifth Annual Conference on Carbon Capture & Sequestration, US Department of Energy on May 10, 2006 http://www.netl.doe.gov/publications/proceedings/06/carbon-seq/Tech%20Session%20193.pdf.
Yaghi, Omar, "Hydrogen Storage in Metal-Organic Frameworks," slide presentation to DOE Hydrogen Program 2007 Annual Merit Review, US Department of Energy, on May 15, 2007 at http://www.hydrogen.energy.gov/pdfs/review07/st_10_yaghi.pdf.
Yang et al., "Four Novel Three-Dimensional Triazole-Based Zinc(II) Metal-Organic Frameworks Controlled by the Spacers of Dicarboxylate Ligands: Hydrothermal Synthesis, Crystal Structure, and Luminescence Properties," Crystal Growth Design 7(10):2009-2015 (2007).
Yang et al. "Two Novel Triazole-Based Metal-Organic Frameworks Consolidated by a Flexible Dicarboxylate Co-ligand: Hydrothermal Synthesis, Crystal Structure, and Luminescence Properties," Australian Journal of Chemistry 61 (10):813-820 (2008).
Zhang et al., "Crystal engineering of binary metal imidazolate and triazolate frameworks," Chem. Comm. 1689-1699 (2006).
Zhang et al., "Syntheses, Structures, and Porous/Luminescent Properties of Silver 3-Alkyl-1,2,4-Triazolate Frameworks with Rare 3-Connected Topologies," Crystal Growth and Design 11:796-802 (2011).
Adkins, Chinessa T. Nonfinal Office Action for U.S. Appl. No. 12/524,205. Mail Date Apr. 17, 2012.
Adkins, Chinessa T. Final Office Action for U.S. Appl. No. 12/524,205. Mail Date Sep. 27, 2012.
Barman et al., "Incorporation of active metal sites in MOFs via in situ generated ligand deficient metal-linker complexes" Chem. Commun. 47:11882-11884 (Oct. 11, 2011).
Bork, Ana-Marie., International Search Report for PCT/US2011/24671, European Patent Office, Nov. 30, 2011.
Burrows et al., "Post-Synthetic Modivication fo Tagged Metal-Organic Frameworks," Angew. Chem Int'l., 2008, pp. 8482-8486, vol. 47.
Chen et al., "Noncovalently Netted, Photoconductive Sheets with Extremely High Carrier Mobility and Conduction Anisotropy from Triphenylene-Fused Meetal Trigon Conjugates," In. J. Am. Chem. Soc. 131:7287-7297 (2009).
Choi et al., "Reversible Interpenetration in a Metal-Organic Framework Triggered by Ligand Removal and Addition," Angew. Chem. Int. Ed. 51:8791-8795 (2012).
Coskun et al., "Metal-Organic Frameworks Incorporating Copper-Complexed Rotaxanes," Angew. Chem. Int. Ed., 51:2160-2163 (2012).
Chun et al., "Concomitant Formation of N-Heterocyclic Carbene-Copper Comlexies within a Supramolecular Network in the Self-Assembly of Immidzolium Dicarboxylate with Metal Ions," Inorganic Chemistry, Jul. 20, 2009, pp. 6353-6355, vol. 48, No. 14.
Chun et al., "Cu2O: A versatile Reagent for Base-Free Direct Synthesis of NHC-Copper Complexes and Decoration of 3D-MOF with Coordinatively Unsaturated NHC-Copper Species," Organometallics, Mar. 16, 2010, pp. 1518-1521, vol. 29, No. 7.
Cordero Garcia, Marcela M. Nonfinal Office Action for U.S. Appl. No. 12/680,141. Mail Date Nov. 2, 2012.
Crees et al., "Synthesis of a Zinc(II) Imidazolium Dicarboxylate Logand Metal-Organic Framework (MOF): a Potential Precursor to MOF-Tethered N-Heterocyclic Carbene Compounds," Inorganic Chemistry, pp. 1712-1719, vol. 49, No. 4.
Demessence, A et al., "Strong CO2 Bnding in a Water-Stable, Triazolate-Bridged Metal-Organic Framework Functionalized with Ethylenediamine," J. Am. Chem. Soc. 131:8784-8786 (2009).
Deng et al., "Large-Pore Apertures in a Series of Metal-Organic Frameworks," Science 336:1018-1023 (May 25, 2012).
Fei et al., "A Nearly Planar Water Sheet Sandwiched between Strontium-Imidazolium Carboxylate Coordination Polymers," Inorg. Chem., 2005, pp. 5200-5202, vol. 44.

Fracaroli et al., "Isomers of Metal-Organic Complex Arrays," Inorg. Chem. 51: 6437-6439 (Jun. 5, 2012).
Furukawa et al., "Isoreticular Expansion of MetalOrganic Frameworks with Triangular and Square Building Units and the Lowest Calculated Density for Porous Crystals," Inorg. Chem. 50:9147-9152 (2011).
Gadzikwa, T. et al., "Selective Bifunctional Modification of a Non-catenated Metal-Organic Framework Material via Click Chemistry," J. Am. Chem. Soc. 131:13613-13615 (2009).
Gandara et al., "Porous, Conductive Metal-Triazolates and Their Structural Elucidation by the Charge-Flipping Method," Chem. Eur. J. 18:10595-10601 (2012).
Gassensmith et al., "Strong and Reversible Binding of Carbon Dioxide in a Green Metal-Organic Framework," J. Am. Chem. Soc. 133:15312-15315 (Aug. 30, 2011).
Goto, Y et al., "Clickable Metal-Organic Framework," J. Am. Chem. Soc. 130:14354-14355 (2008).
Hmadeh et al., "New Porous Crystals of Extended Metal-Catecholates," J. Chem. Mater. 24:3511-3513 (Aug. 28, 2012).
Jones, Christopher. Nonfinal Office Action for U.S. Appl. No. 12/598,855. Mail Date Jun. 14, 2012.
Jones, Christopher. Nonfinal Office Action for U.S. Appl. No. 12/598,855. Mail Date Oct. 12, 2012.
Koh et al., "A Crystalline Mesoporous Coordination Copolymer with High Microporosity," Angew Chem Int'l, 2008, pp. 677-680, vol. 47.
Andrew et al., "Post-Synthetic Modification of Tagged MOFs," Angew. Chem. Int. Ed. 47:8482-8486 (2008).
Ashton, Peter R. et al., "Hydrogen-Bonded Complexes of Aromatic Crown Ethers with (9-Anthracenyl) methylammonium Derivatives" J. Am. Chem. Soc., 1997, 119 (44), pp. 10641-10651.
Baharlou, Simin. International Preliminary Report on Patentability for PCT/US2009/046463. Date of Mailing: Dec. 16, 2010.
Banerjee et al., "High-Throughput Synthesis of Zeolitic Imidazolate Frameworks and Application to CO2 Capture," Science 319:939-943 (2008).
Banerjee et al., "Control of Pore Size and Functionality in Isoreticular Zeolitic Imidazolate Frameworks and their Carbon Dioxide Selective Capture Properties," J. Am. Chem. Soc. 131:3875-3877 (2009).
Barman et al., "Azulene Based Metal-Organic Frameworks for Strong Adsorption of H2," Chem. Commun. 46: 7981-7983 (2010).
Barton et al., "Tailored Porous Materials," Chem. Mater. 11:2633-2656 (1999).
Bloch et al., "Metal Insertion in a Microporous Metal-Organic Framework Lined with 2,2'-Bipyridine" J. Am. Chem. Soc. 132:14382-14384 (2010).
Braun et al., "1,4-Benzenedicarboxylate Derivatives as Links in the Design of Paddle-Wheel Units and Metal-Organic Frameworks," Chem. Commun. 24:2532-2533 (2001).
Britt et al., "Highly efficient separation of carbon dioxide by a metal-organic framework replete with open metal sites," Proc. Natl. Acad. Sci. USA 106:20637-20640 (2009).
Britt et al., "Ring-Opening Reactions Within Metal-Organic Frameworks," Inorg. Chem. 49:6387-6389 (2010).
Carlucci et al., "Nanoporous three-dimensional networks topologically related to cooperite from the self-assembly of copper(I)centres and 1,2,4,5-tetracyanobenzene," New J. Chem. 23(23):397-401 (1999).
Carlucci, Lucia et al., "Polycatenation, polythreading and polyknotting in coordination network chemistry" Coordination Chemistry Reviews 246, 2003, pp. 247-289.
Caskey et al., "Selected Applications of Metal-Organic Frameworks in Sustainable Energy Technologies," Material Matters 4.4:111 (2009).
Centrone et al., "Raman Spectra of Hydrogen and Deuterium Adsorbed on a Metal-Organic Framework," Chem. Phys. Lett. 411:516-519 (2005).
Chae et al., "Tertiary Building Units: Synthesis, Structure, and Porosity of a Metal-Organic Dendrimer Framework (MOD-1)," J. Am. Chem. Soc. 123:11482-11483 (2001).
Chae et al., "Design of Frameworks with Mixed Triangular and Octahedral Building Blocks Exemplified by the Structure of [Zn4O(TCA)2] Having the Pyrite Topology," Angew. Chem. Int. Ed. 42:3907-3909 (2003).

(56) References Cited

OTHER PUBLICATIONS

Chae et al., "A Route to High Surface Area, Porosity and Inclusion of Large Molecules in Crystals," Nature427, 523-527 (2004); Featured in (1) Chemical & Engineering News magazine, Feb. 9, 2004, (2) BBC World Service, Feb. 2004, (3) New Scientist.

Chen et al., "Cu2(ATC)6H2O: Design of Open Metal Sites in Porous Metal-Organic Crystals (ATC: 1,3,5,7-adamantane tetracarboxylate)," J. Am. Chem. Soc. 122:11559-11560 (2000).

Chen et al., "Interwoven Metal-Organic Framework on a Periodic Minimal Surface with Extra-Large Pores," Science 291:1021-1023 (2001); Featured in Chemical and Engineering News, Feb. 21, 2001.

Chen et al., "Transformation of a Metal-Organic Framework from the NbO to PtS Net," Inorg. Chem. 41:181-183 (2005).

Chen et al., "High H2 Adsorption in a Microporous Metal-Organic Framework with Open-Metal Sites," Angew. Chem. Int. Ed. 44:4745-4749 (2005).

Chen et al., "A Microporous Metal-Organic Framework for Gas-Chomatographic Separation of Alkanes," Angew. Chem. Int. Ed. 45:1390-1393 (2006).

Cho et al., "A metal-organic framework material that functions as an enantioselective catalyst for olefin epoxidation," Chem. Comm. 24:2563-2565 (2006).

Choi et al., "Heterogeneity within Order in Crystals of a Porous Metal Organic Framework," J. Am. Chem. Soc. 133:11920-11923 (2011).

Cote et al., "Porous, Crystalline, Covalent Organic Frameworks," Science 310:1166-1170 (2005).

Cote et al., "Reticular Synthesis of Microporous and Mesoporous 2D Covalent Organic Frameworks," J. Am. Chem. Soc. 129:12914-12915 (2007).

Czaja et al., "Industrial applications of metal-organic frameworks," Chemical Society Reviews 38(5):1284-1293 (2009).

Delgado-Friedrichs et al., "Three-Periodic Nets and Tilings: Regular and Quasiregular Nets," Acta Cryst. A59: 22-27 (2003).

Delgado-Friedrichs et al., "Three-Periodic Nets and Tilings: Semiregular Nets," Acta Cryst. A59:515-525 (2003).

Delgado-Friedrichs et al., "The CdSO4, Rutile, Cooperate and Quartz Dual Nets: Interpenetration and Catenation," Solid State Sciences 5:73-78 (2003).

Delgado-Friedrichs et al., "Reticular Chemistry: Occurrence and Taxonomy of Nets, and Grammar for the Design of Frameworks," Acc. Chem. Res. 38:176-182 (2005).

Delgado-Friedrichs et al. "What Do We Know About Three-Periodic Nets?," J. Solid State Chem. 178: 2533-2554 (2005).

Delgado-Friedrichs et al. "Three-Periodic Nets and Tilings: Edge-Transitive Binodal Structures," Acta Cryst. 62:350-355 (2006).

Delgado-Friedrichs et al., "Taxonomy of Periodic Nets and the Design of Materials," Phys. Chem. 9:1035-1043 (2007).

Demir et al., "Role of Copper Species in the Oxidative Dimerization of Arylboronic Acids: Synthesis of Symmetrical Biaryls," Journal of Organic Chemistry 68(26):10130-10134 (2003).

Deng et al., "Multiple Functional Groups of Varying Ratios in Metal-Organic Frameworks," Science 327:846-850 (2010).

Deng et al., "Robust dynamics" Nature Chem. 2:439-443 (2010).

Doonan et al., "Isoreticular Metalation of Metal-Organic Frameworks," J. Am. Chem. Soc. 131:9492-9493 (2009).

Doonan, C., "Hydrogen Storage in Metal-Organic Frameworks," Annual Merit Review Proceedings of DOE Hydrogen Program, May 22, 2009.

Doonan et al., "Exceptional ammonia uptake by a covalent organic framework," Nature Chem. 2:235-238 (2010).

Duren et al., "Design of New Materials for Methane Storage," Langmuir 20:2683-2689 (2004).

Eddaoudi et al., "Design and Synthesis of Metal-Organic Frameworks with Permanent Porosity," In Topics in Catalysis, G. A. Somorjai and J. M. Thomas, Eds., 9:105 (1999).

Eddaoudi et al., "Highly Porous and Stable Metal-Organic Framework: Structure Design and Sorption Properties," J. Am. Chem. Soc. 121:1391-1397 (2000).

Eddaoudi et al., "Porous Metal-Organic Polyhedra: 25 Å Cuboctahedron Constructed from Twelve Cu2(CO2)4 Paddle-Wheel Building Blocks," J. Am. Chem. Soc. 123:4368-4369 (2001).

Eddaoudi et al., "Modular Chemistry: Secondary Building Units as a Basis for the Design of Highly Porous and Robust Metal-Organic Carboxylate Frameworks" Acc. Chem. Res. 34:319-330 (2001).

Eddaoudi et al., "Geometric Requirements and Examples of Important Structures in the Assembly of Square Building Blocks," Proc. Natl. Acad. Sci. 99:4900-4904 (2002).

Eddaoudi et al., "Systematic Design of Pore Size and Functionality in Isoreticular Metal-Organic Frameworks and Application in Methane Storage," Science 295:469-472 (2002): Featured in (1) Chemical and Engineering News, Jan. 21, 2002, and (2) Chemical Insight magazine, Nov. 15, 2002.

Eddaoudi et al., "Cu2[o-Br-C6H3(CO2)2]2(H2O)2•(DMF)8(H2O)2: A Framework Deliberately Designed to have the NbO Structure Type," J. Am. Chem. Soc. 124:376-377 (2002).

Lawrence, Frank M. Nonfinal Office Action for U.S. Appl. No. 12/699,616. Mail Date Apr. 10, 2012.

Lawrence, Frank M. Nonfinal Office Action for U.S. Appl. No. 12/699,616. Mail Date Aug. 3, 2012.

Lee et al., "Synthesis and Gas Sorption Properties of a Metal-Azolium Framework (MAF) Material," Inorganic Chemistry, Nov. 2, 2009, pp. 9971-9973, vol. 48, No. 21.

Li, Y et al., "Hydrogen Storage in Metal-Organic and Covalent-Organic Frameworks by Spillover," AlChe Journal 54 (1):269-279 (2008).

McKeown et al., "Phthalocyanine-Based Nanoporous Network Polymers," Chem. Comm. 23:2780-2781 (Oct. 31, 2002).

McKeown et al., "Porphyrin-Based Nanoporous Network Polymers," Chem. Comm. 23:2782-2783 (Oct. 31, 2002).

Morris et al., "Framework mobility in the metal-organic framework crystal IRMOF-3: Evidence for aromatic ring and amine rotation," Journal of Molecular Structure 1004:94-101 (2011).

Morris et al., "NMR and X-ray Study Revealing the Rigidity of Zeolitic Imidazolate Frameworks," J. Phys. Chem. 116 (24):13307-13312 (Jun. 1, 2012).

Morris et al., "Synthesis, Structure, and Metalation of Two New Highly Porous Zirconium Metal-Organic Frameworks," Inorg. Chem. 51:6443-6445 (Jun. 7, 2012).

O'Keeffe et al., "Deconstructing the Crystal Structures of Metal-Organic Frameworks and Related Materials into Their Underlying Nets," Chem. Rev. 112(2):675-702 (Feb. 8, 2012).

Park, H. et al., "Synthesis, Structure Determination and Hydrogen Sorption Studies of New Metal-Organic Frameworks Using Triazole and Naphthalenedicarboxylic Acid," Chem. Natur. 19:1302-1308 (2007).

Queen et al., "Site-Specific CO2 Adsorption and Zero Thermal Expansion in an Anisotropic Pore Network," J. Phys. Chem. C, 115:24915-24919 (Nov. 8, 2011).

Rinkel, Bert. Extended European Search Report for European Patent Application EP08713961. Mail Date Jan. 2, 2012.

Rouseau-Jager, Nadia, International Search Report and Written Opinion, PCT/US2011/024671, European Patent Office, Dec. 13, 2011.

Sines, Brian J. Nonfinal Office Action for U.S. Appl. No. 13/142,564. Mail Date Jul. 9, 2012.

Song et al., "A Multiunit Catalyst with Synergistic Stability and Reactivity: A PolyoxometalateMetal Organic Framework for Aerobic Decontamination," J. Am. Chem. Soc. 133(42):16839-16846 (Sep. 13, 2011).

Spitler et al., "Lewis Acid Catalyzed Formation of Two-Dimensional Phthalocyanine Covalent Organic Framewokrs." Nature Chem. 2:672-677 (Jun. 20, 2010).

Tilford et al., "Facile Synthesis of a Highly Crystalline, Covalently Porous Boronate Network," 18(22):5296-5301 (Oct. 11, 2006).

Tranchemontagne et al., "Hydrogen Storage in New Metal-Organic Frameworks," J. Phys. Chem. C 116 (24):13143-13151 (May 24, 2012).

Wan et al, "A Belt-Shaped, Blue Luminescent, and Semiconducting Covalent Organic Framework." Angew. Chem. Int. Ed. 47:8826-8830 (2008).

(56) References Cited

OTHER PUBLICATIONS

Wan et al., "Covalent Organic Frameworks with High Charge Carrier Mobility," Chem. Mater. 23:4094-4097 (Aug. 22, 2011).
Yang, E. et al. "Four NovelThree-Dimensional Triazole-Based Zind(II) Metal-Organic Frameworks Controlled by the Spacers of Dicarboxylate Ligands: Hydrotermal Synthesis, Crystal Strucutre, and Luminescence Properties," Cryst. Growth & Design. 7:2009-2015 (2007).
Young, Jung Doo. International Search Report and Written Opinion for PCT/US2011/053423. Date of mailing of ISR Jul. 23, 2012.
Young, Jung Doo. International Search Report and Written Opinion for PCT/US2012/022114. Date of mailing of ISR Aug. 22, 2012.
Young, Jung Doo, "International Search Report and Written Opinion for PCT/2012/023516." Date of mailing of the International Search Report Oct. 19, 2012.
Zhang, J. et al., "Exceptional Framework Flexibility and Sorption Behavior of a Multifunctional Porous Cuprous Triazolate Framework," J. Am. Chem. Soc. 130:6010-6017 (2008).
Zhou, X et al., "Hydrothermal Syntheses and Structures of Three Novel Coordination Polymers Assembled from 1,2,3-Triazolate Ligands," CrystEngComm. 11:1964-1970 (2009).
Hou et al., "Introduction to Metal-Organic Frameworks," Chemical Reviews 112:673-674 (Jan. 26, 2012).
Zhu, a. et al., "Isomeric Zinc(II) Triazolate Frameworks with 3-Connected Networks: Syntheses, Structures, and Sorption Properties," Inorg. Chem. 48:3882-3889 (2009).
Ferragut et al., "Positronium Formation in Porous Materials for Antihydrogen Production,"J. Phys. Conf. Ser. 225:1-8 (2010).
Furukawa et al., "Crystal Structure, Dissolution, and Deposition of a 5 nm Functionalized Metal-Organic Great Rhombicuboctahedron," J. Am. Chem. Soc. 128:8398-8399 (2006).
Furkawa et al., "Independent verification of the saturation hydrogen uptake in MOF-177 and establishment of a benchmark for hydrogen adsorption in metal-organic frameworks," J. Mater. Chem. 17:3197-3204 (2007).
Furukawa et al., "Control of Vertex Geometry, Structure Dimensionality, Functionality, and Pore Metrics in the Reticular Synthesis of Crystalline Metal-Organic Frameworks and Polyhedra," J. Am. Chem. Soc.130:11650-11661 (2008).
Furukawa et al., "Storage of Hydrogen, Methane, and Carbon Dioxide in Highly Porous Covalent Organic Frameworks for Clean Energy Applications," J. Am. Chem. Soc. 25:8876-8883 (2009).
Furukawa et al., "Ultra-High Porosity in Metal-Organic Frameworks," Science 239:424-428 (2010).
Glover et al., "MOF-74 building unit has a direct impact on toxic gas adsorption," J. Chem. Eng. Sci. 66:163-170 (2011).
Gould et al., "The Amphidynamic Character of Crystalline MOF-5: Rotational Dynamics in a Free-Volume Environment," J. Am. Chem. Soc. 130:3246-3247 (2008).
Goebel, Matthias, Supplemental European Search Report and Written Opinion for EP08826913. Date of Completion of Search and Written Opinion: Nov. 10, 2010.
Goebel, Matthias, Supplemental European Search Report and Written Opinion for EP08754337. Date of Completion of Search and Written Opinion: Dec. 3, 2010.
Gonzalez-Arellano et al., "Homogeneous and heterogeneous Au(III) Schiff base-complexes as selective and general catalysts for self-coupling of aryl boronic acids," Chem. Comm. 15:1990-1992 (2005).
Grzesiak et al., "Polymer-Induced Heteronucleation for the Discovery of New Extended Solids," Angew. Chem. Int. Ed. 45:2553-2556 (2006).
Halper et al., "Topological Control in Heterometallic Metal-Organic Frameworks by Anion Templating and Metalloligand Design," J. Am. Chem. Soc. 128:15255-15268 (2006).
Han, SS et al., "Improved designs of metal-organic frameworks for hydrogen storage" Angew. Chem. Int. Ed. 2007, 46, pp. 6289-6292.
Han et al., "Covalent Organic Frameworks as Exceptional Hydrogen Storage Materials," J. Am. Chem. Soc. 130: 11580-11581 (2008).
Hayashi et al., "Zeolite A Imidazolate Frameworks," Nature Materials 6:501-506 (2007).

Hexiang et al., "Multiple Functional Groups of Varying Rations in Metal-Organic Frameworks," Science 327 (5967):846-850 (2010).
Holler et al., "The first dinitrile frameworks of the rare earth elements: [LnCl3(1,4-Ph(CN)2] and [Ln2Cl6(1,4Ph(CN)2], Ln=Sm, Gd, Tb, Y; Access to novel metal-organic frameworks by solvent free synthesis in molten 1,4-benodinitrile," Inorganic Chemistry 47(21): 10141-9 (2008).
Honda, Masashi, International Preliminary Report on Patentability for PCT/US2008/051859. Date of Issuance of the Report: Jul. 28, 2009.
Howe, Patrick. International Search Report and Written Opinion for PCT/US2009/068849. Date of Mailing of the Search Report: Jun. 4, 2010.
Howe, Patrick. International Search Report and Written Opinion for PCT/US2010/022777. Date of Mailing: Jun. 7, 2010.
Huang et al., "Thermal Conductivity of Metal-Organic Framework 5 (MOF-5): Part II. Measurement," Int. J. Heat Mass Transfer 50:405-411 (2007).
Hunt et al., "Reticular Synthesis of Covalent Organic Borosilicate Frameworks," J. Am. Chem. Soc. 130: 11872-11873 (2008).
Isaeva et al., "Metal-organic frameworks-new materials for hydrogen storage," Russian Journal of General Chemistry 77(4):721-739 (2007).
Jeong et al., "Asymmetric Catalytic Reactions by NbO-Type Chiral Metal-Organic Frameworks," Chem. Sci. 2:877-882 (2011).
Kaderi et al., "Designed Synthesis of 3D Covalent Organic Frameworks," Science 316:268-272 (2007).
Kaye et al., "Impact of Preparation and Handling on the Hydrogen Storage Properties of Zn4O(1,4-benzenedicarboxylate)3 (MOF-5)," J. Am. Chem. Soc. 129:14176-14177 (2007).
Kim et al., "Assembly of Metal-Organic Frameworks From Large Organic and Inorganic Secondary Building Units: New Examples and Simplifying Principles for Complex Structures," J. Am. Chem. Soc. 123:8239-8247 (2001).
Kim, Su Mi, International Search Report and Written Opinion for PCT/US2009/068731. Date of Mailing: Aug. 19, 2010.
Kim, Su Mi, International Search Report and Written Opinion, Date of Mailing: Feb. 24, 2010, International Application No. PCT/US09/46463.
Kim, Su Mi. International Search Report for PCT/US2010/039154. Date of Mailing: Feb. 23, 2011.
Kirai et al., "Homocoupling of arylboronic acids catalyzed by 1,10-phenanthroline-ligated copper complexes in air," European Journal of Organic Chemistry 12:1864-1867 (2009).
Klaes, Daphne. International Search Report and Written Opinion for PCT/US2010/021201. Date of Mailing: Apr. 27, 2010.
Koza et al., "An efficient High Yielding Approach for the Homocoupling of Aryl Boronic Acids," Synthesis 15:2183-2186 (2002).
Kyoungmoo et al., "A Crystalline Mesoporous Coordination Copolymer with High Microporosity," Angew. Chem. Int. Ed. 47(4):677-680 (2008).
Lee, Ji Min. International Search Report for PCT/US2010/039284. Date of Mailing: Feb. 22, 2011.
Li et al., "Coordinatively Unsaturated Metal Centers in the Extended Porous Framewokr of Zn3(BDC)3-6CH3OH (BDC=1,4-Benzenedicarboxylate)," J. Am. Chem. Soc. 2186-2187 (1998).
Li et al., "Establishing Microporosity in Open Metal-Organic Frameworks: Gas Sorption Isotherms for Zn(BDC) (BDC=1,4-Benzenedicaroxylate)," J. Am. Chem. Soc. 120:8571-8572 (1998).
Li et al., "Porous Germanates: Synthesis, Structure and Inclusion Properties of Ge7O14.5F2-[(CH3)2NH2]3(H2O)O.86," J. Am. Chem. Soc. 120:8567-8568 (1998).
Li et al., "Transformation of Germanium Dioxide to 4-Connected Porous Germanate Net," J. Am. Chem. Soc. 10569-10570 (1998).
Li et al., "An Open-Framework Germanate with Polycubane-Like Topology," Angew. Chem. INt. Ed., 38:653-655 (1999).
Li et al., "Supertetrahedral Sulfide Crystals with Giant Cavities and Channels," Science 283:1145-1147 (1999).
Li et al., "Non-interpenetrating Indium Sulfide with a Supertetrahedral Cristobalite Framework," J. Am. Chem. Soc. 121:6096-6097 (1999).

(56) References Cited

OTHER PUBLICATIONS

Li et al., "Design and Synthesis of an Exceptionally Stable and Highly Porous Metal-Organic Framework," Science 402:276-279 (1999); Featured in (1) Chemical and Engineering News (Nov. 22, 19999) and (2) Science News (Nov. 20, 1999).

Li et al., "Ge2ZrO6F2 (H2DAB)H2O: A 4-Connected Microporous Material with "Bow Tie" Building Units and an Exceptional Proportion of 3-Rings," J. Am. Chem. Soc. 122:12409-12410 (2000).

Li et al., "20 Å [Cd4In16S35]14-Supertetrahedral T4 Clusters as Building Units in Decorated Cristobalite Frameworks," J. Am. Chem Soc. 123:4867-4868 (2001).

Li et al., "[Cd16In64S134]44-: 31-ÅTetrahedron with a Large Cavity," Angew. Chem. Int. Ed 42:1819-1821 (2003).

Li et al., "A metal-organic framework replete with ordered donor-acceptor catenanes," Chem. Commun. 46:380-382 (2010).

Li et al., "A Catenated Strut in a Catenated Metal-Organic Framework," Angew. Chem. Int. Ed. 49:6751-6755 (2010).

Linder, Nora. International Preliminary Report on Patentability for PCT/US2010/022777. Date of Mailing: Aug. 11, 2011.

Stallmach et al., "NMR Studies on the Diffusion of Hydrocarbons on the Metal-Organic Framework Material MOF-5," Angew. Chem. Int. Ed. 45:2123-2126 (2006).

Sudik et al., "Design, Synthesis, Structure, and Gas (N2, Ar, CO2, CH4 and H2) Sorption Properties of Porous Metal-Organic Tetrahedral and Heterocuboidal Polyhedra," J. Am. Chem. Soc. 127:7110-7118 (2005).

Sudik et al., "Metal-Organic Frameworks Based on Trigonal Prismatic Building Blocks and the New "acs" Topology," Inorg. Chem. 44:2998-3000 (2005).

Sudik et al., "A Metal-Organic Framework with a Hierarchical System of Pores and Tetrahedral Bbuilding Blocks," Angew. Chem. Int. Ed. 45:2528-2533 (2006).

Tranchemontagne et al. "Metal-Organic Frameworks with High Capacity and Selectivity for Harmful Gases," Proc. Natl. Acad. Sci. USA 105:11623-11627 (2008).

Tranchemontagne et al., "Reticular Chemistry of Metal-Organic Polyhedra," Angew. Chem. Int. Ed., 2008, 47:5136-5147 (2008).

Tranchemontagne et al., "Room Temperature Synthesis of Metal-organic Frameworks: MOF-5, MOF-74, MOF-177, MOF-199, and IRMOF-0," Tetrahedron 64:8553-8557 (2008).

Tranchemontagne et al. "Secondary Building Units, Nets and Bonding in the Chemistry of Metal-Organic Frameworks," Chem. Soc. Rev. 38:1257-1283 (2009).

Uribe-Romo et al., "A Crystalline Imine-Linked 3-D Porous Covalent Organic Framework," J. Am. Chem. Soc. 131:4570-4571 (2009).

Uribe-Romo et al., "Crystalline Covalent Organic Frameworks with Hydrazone Linkages," J. Am. Chem. Soc. 133: 11478-11481 (2011).

Vairaprakash et al., "Synthesis of Metal-Organic Complex Arrays," J. Am. Chem. Soc. 133:759-761 (2011).

Valente et al., "Metal-organic Frameworks with Designed Chiral Recognition Sites," Chem. Commun. 46: 4911-4913 (2010).

Vodak et al., "Metal-Organic Frameworks Constructed from Pentagonal Antiprismatic and Cuboctahedral Secondary Building Units," Chem. Commun. 2534-2535 (2001).

Vodak et al., "One-Step Synthesis and Structure of an Oligo(spiro-orthocarbonate)," J. Am. Chem. Soc.124 (18):4942-4943 (2002).

Vodak et al., "Computation of Aromatic C3N4 Networks and Synthesis of the Molecular Precursor N(C3N3)3C16," Chem. Eur. J. 9:4197-4201 (2003).

Walton et al., "Understanding Inflections and Steps in Carbon Dioxide Adsorption Isotherms in Metal-Organic Frameworks," J. Am. Chem. Soc.130:406-407 (2008).

Wang et al., "Colossal Cages in Zeolitic Imidazolate Frameworks as Selective Carbon Dioxide Reservoirs," Nature 453:207-211 (2008).

Wong-Foy, AG et al., "Exceptional H2 saturation uptake in microporous metal-organic frameworks" J. Am. Chem. Soc., 2006, 128, pp. 3494-3495.

Yaghi et al., "Selective binding and removal of guests in a microporous metal-organic framework," Nature, Dec. 1995, pp. 703-706, vol. 378.

Yaghi et al., "Conversion of Hydrogen-Bonded manganese(II) and zinc(II) squarate (C4O42-) molecules, Chains, and Sheets to 3-D Cage Networks," J. Chem. Soc., Dalton Trans., 1995, 727-732.

Yaghi et al., "Presence of Mutually Interpenetrating Sheets and Channels in the Extended Structure of Cu(4,4'- Bipyndine)Cl," Angew. Chem. Int. Ed. Engl., 1995, 34, 207-209.

Yaghi et al., "The Utility of Polymeric Matrices in the Preparation of Single Crystals of Coordination Solids: Synthesis and Structure of CuII(1,4-C4H4N2)(C4O4)(OH2)4," J. Solid State Chem., 1995, 117, 256-260.

Yaghi et al., "Open-Framework Solids with Diamond-Like Structures Prepared from Clusters and Metal-Organic Building Blocks,"Mater. Res. Soc. Symp. Proc., 1995, 371, 15.

Yaghi et al., "Hydrothermal Synthesis of a Metal-Organic Framework Containing Large Rectangular Channels," J. Am. Chem. Soc., 1995, 117, 10401-10402.

Yaghi et al., "Construction of Microporous Materials from Molecular Building Blocks," Fundamental Materials Research, T. J. Pinnavaia and M. F. Thorpe, eds., vol. II, Plenum: New York, p. 111 (1995).

Yaghi et al., "T-Shaped Molecular Building Units in the Porous Structure of Ag(4,4'-bpy) NO3," J. Am. Chem. Soc., 1996, 118, 295-296.

Yaghi et al., "Construction of Porous Solids from Hydrogen-Bonded Metal Complexes of 1,3,5-Benzenetricarboxylic Acid," J. Am. Chem. Soc., 1996, 118, 9096-9101.

Yaghi et al., "Conversion of Molecules and Clusters to Extended 3-D Cage and Channel Networks," Metal Containing Polymeric Materials, C. U. Pittman, C. E. Carraher, B. M. Culbertson, M. Zeldin, J. E. Sheets, Eds., Plenum: New York, p. 219 (1996).

Yaghi et al., "Selective Guest Binding by Tailored Channels in a 3-D Porous Zinc(II)-1,3,5-Benzenetricarboxylate Network," J. Am. Chem. Soc., 1997, 119, 2861-2868.

Yaghi et al., "Crystal Growth of Extended Solids by Nonaqueous Gel Diffusion," Chem. Mater., 1997, 9, 1074-1076.

Yaghi et al., "A Molecular Railroad with Large Pores: Synthesis and Structure of Ni(4,4'-bpy)2.5(H2O)2(ClO4)2•1.5(4,4'-bpy)2(H2O)," Inorg. Chem., 1997, 36, 4292-4293.

Yaghi et al., "Construction of a New Open-Framework Solid form 1,3,5-Cyclohexanetricarboxylate and Zinc(II) Building Blocks," J. Chem. Soc. Dalton Trans. 2383-2384 (1997).

Yaghi et al., "Synthesis and Structure of a Metal-Organic Solid Having the Cadmium (II) Sulfate Net," Mater. Res. Soc. Symp. Proc. 453:127 , (1997).

Yaghi et al., "Designing Microporosity in Coordination Solids," Modular Chemistry, J. Michl, Ed., Kluwer: Boston, p. 663 (1997).

Yaghi et al., "Synthetic Strategies, Structure Patterns, and Emerging Properties in the Chemistry of Modular Porous Solids," Acc. Chem. Res. 31:474-484 (1998).

Yaghi et al., "Transformation of Germanium Dioxide to 4-Connected Porous Germanate Net," J. Am. Chem. Soc., 20:10569-10570 (1998).

Yaghi et al., "Design of Solids from Molecular Building Blocks: Golden Opportunities for Solid State Chemistry," J. Solid State Chem. 152, 1-2 (2000).

Yaghi et al., "A Molecular World Full of Holes," Chem. Innov. p. 3 (2000).

Yaghi et al., "Reticular Synthesis and the Design of New Materials," Nature 423:705-714 (2003).

Yaghi et al., "Metal-Organic Frameworks: A Tale of Two Entanglements," Nature materials 6:92-93 (2007).

Yaghi et al., "Reticular Chemistry and Metal-Organic Frameworks for Clean Energy," MRS Bulletin 34:682-690 (2009).

Young, Lee W., International Search Report and Written Opinion, Date of Mailing of Report: May 7, 2008, International Application No. PCT/US08/51859.

Young, Lee W., "International search Report and Written Opinion," PCT/US08/06008, United States Patent & Trademark Office, Aug. 20, 2008.

Young, Lee W., International Search Report and Written Opinion, Date of Mailing: Dec. 2, 2008, International Application No. PCT/US08/77741.

(56) References Cited

OTHER PUBLICATIONS

Young, Lee W., International Search Report and Written Opinion, Date of Mailing: Jan. 12, 2009, International Application No. PCT/US08/70149.

Young, Jung Doo. International Search Report for PCT/US2010/050170. Date of Mailing: Jun. 8, 2011.

Zhang et al., "Docking in Metal-Organic Frameworks," Science 325:855-859 (2009).

Zhao et al., "Rigid-Strut-Containing Crown Ethers and [2]Catenanes for Incorporation into Metal-Organic Frameworks," Chem. Eur. J. 15:13356-13380 (2009).

Zhao, Wei. The First Office Action for Chinese Application No. 200880003157.2. The State Intellectual Property Office of the People's Republic of China. Issue Date: Aug. 5, 2011.

Zhofu et al., "A Nearly Planar Water Sheet Sandwiched between Strontium-Imidazolium Carboxylate Coordination Polymers," Inorg. Chem. 44:5200-5202 (2005).

\* cited by examiner

CARBON DIOXIDE CAPTURE AND STORAGE USING OPEN FRAMEWORKS

CROSS REFERENCE TO RELATED APPLICATIONS

This application is a U.S. National Stage Application filed under 35 U.S.C. §371 and claims priority to International Application No. PCT/US10/39123, filed Jun. 18, 2010, which application claims priority under 35 U.S.C. §119 from Provisional Application Ser. No. 61/218,884, filed Jun. 19, 2009, the disclosures of which are incorporated herein by reference in their entirety.

STATEMENT AS TO FEDERALLY SPONSORED RESEARCH

This invention was made with Government support from Grant No. W911NF-07-1-0533 awarded by the U.S. Army. The U.S. government has certain rights in this invention.

TECHNICAL FIELD

Methods and compositions useful for gas storage and separation are provided. More particularly, compositions and methods for $CO_2$ storage and separation are provided comprising an open metal organic framework.

BACKGROUND

Selective removal of $CO_2$ from gaseous mixtures is of paramount importance for the purification of fuel gases such as methane and acetylene, and due to the imminent problem of anthropogenic $CO_2$ emissions. Effective systems for $CO_2$ removal must combine high selectivity and capacity with minimal energetic input to liberate the captured $CO_2$. Materials presently used are amine solutions, zeolites, and porous membranes; but all fall short in one or more of these categories. To date, metal-organic frameworks (MOFs) have been shown to exhibit exceptional $CO_2$ storage capacity under equilibrium conditions where pure $CO_2$ is introduced into the pores. However, their capacities are dramatically reduced when exposed to mixtures of gases under dynamic conditions, as would be the case in power plant flue gas and methane mining applications. A useful measure of dynamic separation capacity is obtained by exposing the material to mixed gas streams and detecting the appearance or "breakthrough" of $CO_2$ from the material.

SUMMARY

The disclosure provides a method of $CO_2$ storage or separation from a gaseous mixture comprising contacting a porous metal organic framework comprising a MOF-74 topology and comprising a Mg metal with a $CO_2$ containing fluid. In one embodiment, a replaceable guest species is present in the framework. In yet another embodiment, the Mg metal in said framework is unsaturated. In yet a further embodiment, the metal organic framework comprises Mg-MOF-74. In one embodiment, the fluid is a mixture. In a further embodiment, the fluid comprises a plurality of different gases. In one embodiment, the method reversibly adsorbs $CO_2$. In yet another embodiment, the method comprises contacting a column or bed of Mg-MOF-74 with a fluid comprising $CO_2$.

The disclosure also provides a gas separation bed comprising a Mg-MOF-74.

The disclosure provides a method of separating gases in a fluid containing $CO_2$ comprising contacting a porous framework comprising Mg-MOF-74 with the fluid, wherein the $CO_2$ is absorbed or adsorbed to the porous metal organic framework. In one embodiment, the method further comprises a plurality of different porous organic frameworks having differing gas absorption or adsorption specificities, wherein at least one of the porous organic frameworks comprises Mg-MOF-74.

The disclosure provides a device for removal of a $CO_2$ gas having a filter comprising a Mg-MOF-74 framework. In one embodiment, the device is a personnel device. In a further embodiment, the device is a gas mask. In yet another embodiment, the device comprises a fixed bed of Mg-MOF-74.

The disclosure also provides a method of detecting the presence of a $CO_2$ comprising contacting a porous organic framework comprising Mg-MOF-74 with a fluid suspected of containing a $CO_2$ and measuring a change in optical color of the metal organic framework.

The disclosure provides a filter medium comprising a porous framework comprising Mg-MOF-74. The filter medium can be present in a filtration system.

The disclosure provides a metal organic framework (MOF) replete with open magnesium sites, Mg-MOF-74, having excellent selectivity, facile regeneration, and among the highest dynamic capacities reported for $CO_2$ in porous materials. For example, when Mg-MOF-74 is subjected to a gas stream containing 20% $CO_2$ in $CH_4$, a percentage in the range relevant to industrial separations, it captures only $CO_2$ and not $CH_4$. The pores retain 89 g of $CO_2$ per kilogram of material before breakthrough; a value that is higher than any other achieved in MOFs and rivals the highest capacities in zeolites. Remarkably, 87% of the captured $CO_2$ can be liberated at room temperature and the remaining amount can be completely removed by mild heating (80 C). Based on this performance, MOFs represent a competitive class of materials for efficient $CO_2$ capture and that Mg-MOF-74 strikes the right balance between high capacity and heat of adsorption, notwithstanding the great opportunities available for functionalizing such MOFs for even further improved performance.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
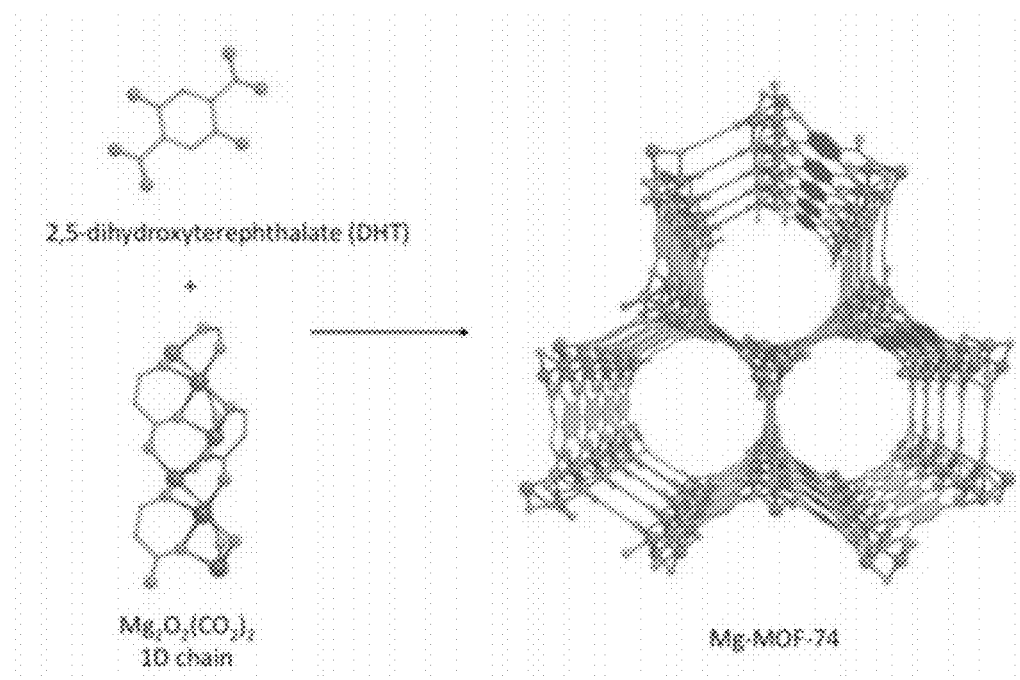
FIG. 1 shows a single crystal structure of Mg-MOF-74, a composite of the DHT linker and 1D chain building unit. C, O, and Mg atoms are shown. H atoms are omitted for clarity.

As used herein and in the appended claims, the singular forms "a," "and," and "the" include plural referents unless the context clearly dictates otherwise. Thus, for example, reference to "a framework" includes a plurality of such frameworks and reference to "the metal" includes reference to one or more metals and equivalents thereof known to those skilled in the art, and so forth.

Unless defined otherwise, all technical and scientific terms used herein have the same meaning as commonly understood to one of ordinary skill in the art to which this disclosure belongs. Although any methods and reagents similar or equivalent to those described herein can be used in the practice of the disclosed methods and compositions, the exemplary methods and materials are now described.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure.

Carbon dioxide ($CO_2$) accounts for more than half of the enhanced greenhouse effect, which is responsible for global warming. The atmospheric concentration of $CO_2$ has increased from 280 ppm before the Industrial Revolution to ~365 ppm today. This is mainly due to the unabated emission of $CO_2$ as a result of increasing consumption of fossil fuels such as coal, oil and natural gas. Point sources, such as electric utility plants that contribute to about one-third of all anthropogenic $CO_2$ emissions, are ideal candidates for implementing $CO_2$ reduction practices due to the relatively high concentration and quantity of $CO_2$ emitted compared to smaller, mobile sources. Coal consumption leads to high $CO_2$ emissions at these large point sources due to its dominant use in electricity generation (~52%) and higher energy specific $CO_2$ emission due to its high carbon to hydrogen content compared to other fossil fuels. Comprehensive $CO_2$ management scenarios involve a three-step process that includes separation, transportation and safe sequestration of $CO_2$. Economic analysis has shown that $CO_2$ separation accounts for 75-85% of the overall cost associated with carbon sequestration.

Natural gas is an important fuel gas and it is used extensively as a basic raw material in the petrochemical and other chemical process industries. The composition of natural gas varies widely from field to field. Many natural gas reservoirs contain relatively low percentages of hydrocarbons (less than 40%, for example) and high percentages of acid gases, principally carbon dioxide, but also hydrogen sulfide, carbonyl sulfide, carbon disulfide and various mercaptans. Removal of acid gases from natural gas produced in remote locations is desirable to provide conditioned or sweet, dry natural gas either for delivery to a pipeline, natural gas liquids recovery, helium recovery, conversion to liquefied natural gas (LNG), or for subsequent nitrogen rejection. $CO_2$ is corrosive in the presence of water, and it can form dry ice, hydrates and can cause freeze-up problems in pipelines and in cryogenic equipment often used in processing natural gas. Also, by not contributing to the heating value, $CO_2$ merely adds to the cost of gas transmission.

An important aspect of any natural gas treating process is economics. Natural gas is typically treated in high volumes, making even slight differences in capital and operating costs of the treating unit significant factors in the selection of process technology. Some natural gas resources are now uneconomical to produce because of processing costs. There is a continuing need for improved natural gas treating processes that have high reliability and represent simplicity of operation.

In addition, removal of carbon dioxide from the flue exhaust of power plants, currently a major source of anthropogenic carbon dioxide, is commonly accomplished by chilling and pressurizing the exhaust or by passing the fumes through a fluidized bed of aqueous amine solution, both of which are costly and inefficient. Other methods based on chemisorption of carbon dioxide on oxide surfaces or adsorption within porous silicates, carbon, and membranes have been pursued as means for carbon dioxide uptake. However, in order for an effective adsorption medium to have long term viability in carbon dioxide removal it should combine two features: (i) a periodic structure for which carbon dioxide uptake and release is fully reversible, and (ii) a flexibility with which chemical functionalization and molecular level fine-tuning can be achieved for optimized uptake capacities.

The disclosure demonstrates that open metal sites within MOFs significantly elevate their performance to the point of exceeding other adsorbent materials and demonstrate great advantage in the facile release of $CO_2$. Indeed, the great flexibility with which MOF structures can be varied in composition and functionality of both the metal and the organic link make them stand out as excellent candidates for addressing the challenges of $CO_2$ emissions and natural gas purification.

Metal-organic frameworks (MOFs) are a class of crystalline porous materials whose structure is composed of metal-oxide units joined by organic linkers through strong covalent bonds. The flexibility with which these components can be varied has led to an extensive class of MOF structures with ultra-high surface areas, far exceeding those achieved for porous carbons. MOFs exhibit high thermal stability, with decomposition between 350° C. and 400° C. in the case of MOF-5(Eddaoudi M, et al., Science 295:469-472, 2002), ensuring their applicability across a wise temperature range. The unprecedented surface area and the control with which their pore metrics and functionality can be designed provides limitless potential for their structure to be tailored to carry out a specific application, thus suggesting the possibility of being superior to activated carbons in many applications.

While application of MOFs to high-density gas storage has been studied, virtually no work has been undertaken to measure their capacity for dynamic gas adsorption properties. Equilibrium adsorption does not adequately predict selectivity, as dynamic capacity is influenced strongly by the kinetics of adsorption. The kinetic properties of adsorption in MOFs are largely unexamined. For these reasons it is necessary to calculate the dynamic adsorption capacity, which is defined as the quantity of a gas adsorbed by a material prior to the time at which the concentration of the gas in the effluent stream reaches an arbitrary "breakthrough" value, 5% of the feed concentration. The disclosure demonstrates a series of dynamic adsorption experiments that establish benchmarks for adsorption capacity in MOFs across a range of contaminant gases and vapors.

Coordinatively unsaturated (open) metal sites in MOFs can be prepared by removal of coordinated solvent molecules. Whereas flexible molecular or polymeric structures rearrange or aggregate to occlude such reactive sites. The rigidity of MOFs ensures that open metal sites remain accessible to incoming guests. MOF-74, a prototypical example, has one-dimensional hexagonal channels with 5-coordinate zinc(II) ions decorating the edges of each channel. This material was found to have exceptional separation capacity for gases such as sulphur dioxide, ammonia, and ethylene oxide and $H_2$ storage capacity.

Substitutions of various divalent metal ions in place of the zinc(II) ions provides a new set of MOFs having different gas selectivity and breakthrough criteria. For example, MOFs in which the 5-coordinate zinc(II) ions of MOF-74 are substituted for various divalent metal ions, including nickel, cobalt, and magnesium, is possible. The $CO_2$ uptake of the latter, Mg-MOF-74, was found to be exceptionally high at low-pressure (<0.1 atm) in equilibrium isotherm experiments performed at room temperature. Indeed, initial isosteric heat of adsorption was calculated to be 39 kJ $mol^{-1}$. This value reflects a strong physisorption interaction but remains well below the energy of a chemical bond, which is desirable for facile $CO_2$ release. Another encouraging feature of this MOF is that the ratio of the Henry's Law constant for $CO_2$ and $CH_4$ adsorption is as high as 330. This value, which is more than an order of magnitude higher than the best reported in MOFs, indicates that this material has the thermodynamic selectivity necessary for effective separation. Therefore, these attributes make this MOF an excellent candidate for substantial binding of $CO_2$ from an incoming gas stream without prohibitive energetic requirements for its removal.

MOFs also provide are ready source of diverse topologies that can be designed to have various functional characteristics. MOFs have the general structure M-L-M, wherein M is a metal and L is a linking moiety. The linking moiety bonds the metal through condensation of a linking cluster. A typical linking cluster is a carboxylic acid group(s). The linking cluster comprises a substructure that can be further functionalized by the addition of "side group(s)" that are capable of reacting with a guest species.

The term "cluster" refers to identifiable associations of 2 or more atoms. Such associations are typically established by some type of bond—ionic, covalent, Van der Waal, and the like.

A "linking cluster" refers to a one or more reactive species capable of condensation comprising an atom capable of forming a bond between a linking moiety substructure and a metal group or core, or between a linking moiety and another linking moiety. Examples of such species are selected from the group consisting of a boron, oxygen, carbon, nitrogen, and phosphorous atom. In some embodiments, the linking cluster may comprise one or more different reactive species capable of forming a link with a bridging oxygen atom. For example, a linking cluster can comprise $CO_2H$, $CS_2H$, $NO_2$, $SO_3H$, $Si(OH)_3$, $Ge(OH)_3$, $Sn(OH)_3$, $Si(SH)_4$, $Ge(SH)_4$, $Sn(SH)_4$, $SO_3H$, $AsO_3H$, $AsO_4H$, $P(SH)_3$, $As(SH)_3$, $CH(RSH)_2$, $C(RSH)_3$, $CH(RNH_2)_2$, $C(RNH_2)_3$, $CH(ROH)_2$, $C(ROH)_3$, $CH(RCN)_2$, $C(RCN)_3$, $CH(SH)_2$, $C(SH)_3$, $CH(NH_2)_2$, $C(NH_2)_3$, $CH(OH)_2$, $C(OH)_3$, $CH(CN)_2$, and $C(CN)_3$, wherein R is an alkyl group having from 1 to 5 carbon atoms, or an aryl group comprising 1 to 2 phenyl rings.

A "linking moiety" refers to a mono-dentate or polydentate compound that bind a metal or a plurality of metals or cores, respectively. Generally a linking moiety comprises a substructure covalently linked to an alkyl or cycloalkyl group, comprising 1 to 20 carbon atoms, an aryl group comprising 1 to 5 phenyl rings, or an alkyl or aryl amine comprising alkyl or cycloalkyl groups having from 1 to 20 carbon atoms or aryl groups comprising 1 to 5 phenyl rings, and in which a linking cluster are covalently bound to the substructure. A cycloalkyl or aryl substructure may comprise 1 to 5 rings that comprise either of all carbon or a mixture of carbon with nitrogen, oxygen, sulfur, boron, phosphorus, silicon and/or aluminum atoms making up the ring. Typically the linking moiety will comprise a substructure having one or more carboxylic acid linking clusters covalently attached.

As used herein, a line in a chemical formula with an atom on one end and nothing on the other end means that the formula refers to a chemical fragment that is bonded to another entity on the end without an atom attached. Sometimes for emphasis, a wavy line will intersect the line.

In one embodiment, the linking moiety comprises a structure selected from the group consisting of:

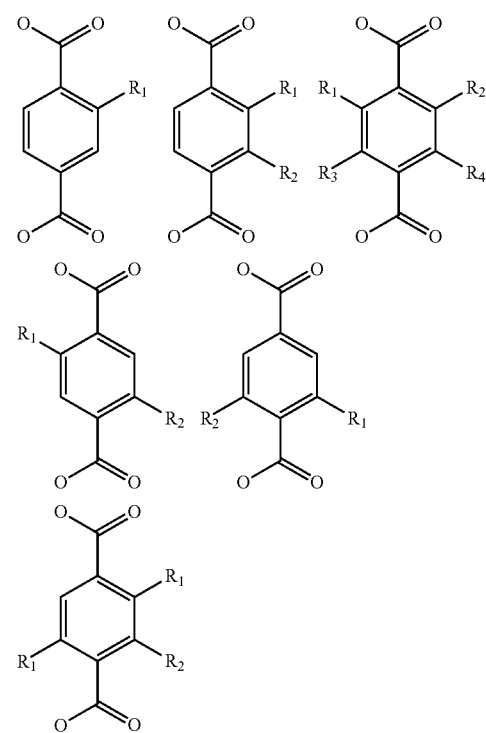

wherein the carboxylic acid groups above undergo a condensation with a transition metal to form a framework and wherein $R_1$, $R_2$, $R_3$, $R_4$=$NH_2$, CN, OH, =O, =S, SH, P, Br, CL, I, F,

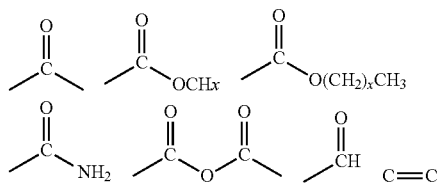

-continued

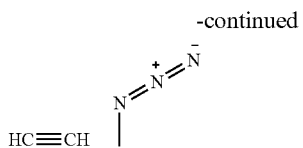

wherein X=1, 2, or 3.

The disclosure provides MOFs functionalized with, for example, magnesium capable of interacting with $CO_2$. For example, an Mg-MOF-74 framework of the disclosure may be further functionalized to include additional magnesium metal covalently linked to a linking moiety substructure. In other embodiment, a MOF can comprise a metal other than magnesium either as the core of the framework or functionalized after generation of the framework.

A post framework reactant refers to any organic reactant. Rings of 1-20 carbons with functional groups comprising atoms such as N, S, O, and P are useful. In addition, metal and metal containing compounds that may chelate to and add functional groups or a combination of previously existing and newly added functional groups are also useful. Reactions that result in the tethering of organometallic complexes to the framework for use as, for example, a heterogeneous catalyst can be used. For example, converting a reactive side group in a linking agent to an alcohol followed by reacting the group with an alkali earth metal to generate a metal alkoxide is provided.

Examples of post framework reactants include, but are not limited to, heterocyclic compounds. In one embodiment, the post framework reactant can be a saturated or unsaturated heterocycle. The term "heterocycle" used alone or as a suffix or prefix, refers to a ring-containing structure or molecule having one or more multivalent heteroatoms, independently selected from N, O and S, as a part of the ring structure and including at least 3 and up to about 20 atoms in the ring(s). Heterocycle may be saturated or unsaturated, containing one or more double bonds, and heterocycle may contain more than one ring. When a heterocycle contains more than one ring, the rings may be fused or unfused. Fused rings generally refer to at least two rings share two atoms there between. Heterocycle may have aromatic character or may not have aromatic character. The terms "heterocyclic group", "heterocyclic moiety", "heterocyclic", or "heterocyclo" used alone or as a suffix or prefix, refers to a radical derived from a heterocycle by removing one or more hydrogens there from. The term "heterocyclyl" used alone or as a suffix or prefix, refers a monovalent radical derived from a heterocycle by removing one hydrogen there from. The term "heteroaryl" used alone or as a suffix or prefix, refers to a heterocyclyl having aromatic character. Heterocycle includes, for example, monocyclic heterocycles such as: aziridine, oxirane, thiirane, azetidine, oxetane, thietane, pyrrolidine, pyrroline, imidazolidine, pyrazolidine, pyrazoline, dioxolane, sulfolane 2,3-dihydrofuran, 2,5-dihydrofuran tetrahydrofuran, thiophane, piperidine, 1,2,3,6-tetrahydro-pyridine, piperazine, morpholine, thiomorpholine, pyran, thiopyran, 2,3-dihydropyran, tetrahydropyran, 1,4-dihydropyridine, 1,4-dioxane, 1,3-dioxane, dioxane, homopiperidine, 2,3,4,7-tetrahydro-1H-azepine homopiperazine, 1,3-dioxepane, 4,7-dihydro-1,3-dioxepin, and hexamethylene oxide. For example, heterocycles useful in the methods of the disclosure include:

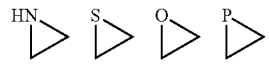

In addition, heterocycle includes aromatic heterocycles (heteroaryl groups), for example, pyridine, pyrazine, pyrimidine, pyridazine, thiophene, furan, furazan, pyrrole, imidazole, thiazole, oxazole, pyrazole, isothiazole, isoxazole, 1,2,3-triazole, tetrazole, 1,2,3-thiadiazole, 1,2,3-oxadiazole, 1,2,4-triazole, 1,2,4-thiadiazole, 1,2,4-oxadiazole, 1,3,4-triazole, 1,3,4-thiadiazole, and 1,3,4-oxadiazole.

Additionally, heterocycle encompass polycyclic heterocycles, for example, indole, indoline, isoindoline, quinoline, tetrahydroquinoline, isoquinoline, tetrahydroisoquinoline, 1,4-benzodioxan, coumarin, dihydrocoumarin, benzofuran, 2,3-dihydrobenzofuran, isobenzofuran, chromene, chroman, isochroman, xanthene, phenoxathiin, thianthrene, indolizine, isoindole, indazole, purine, phthalazine, naphthyridine, quinoxaline, quinazoline, cinnoline, pteridine, phenanthridine, perimidine, phenanthroline, phenazine, phenothiazine, phenoxazine, 1,2-benzisoxazole, benzothiophene, benzoxazole, benzthiazole, benzimidazole, benztriazole, thioxanthine, carbazole, carboline, acridine, pyrolizidine, and quinolizidine.

In addition to the polycyclic heterocycles described above, heterocycle includes polycyclic heterocycles wherein the ring fusion between two or more rings includes more than one bond common to both rings and more than two atoms common to both rings. Examples of such bridged heterocycles include quinuclidine, diazabicyclo[2.2.1]heptane and 7-oxabicyclo[2.2.1]heptane.

Heterocyclyl includes, for example, monocyclic heterocyclyls, such as: aziridinyl, oxiranyl, thiiranyl, azetidinyl, oxetanyl, thietanyl, pyrrolidinyl, pyrrolinyl, imidazolidinyl, pyrazolidinyl, pyrazolinyl, dioxolanyl, sulfolanyl, 2,3-dihydrofuranyl, 2,5-dihydrofuranyl, tetrahydrofuranyl, thiophanyl, piperidinyl, 1,2,3,6-tetrahydro-pyridinyl, piperazinyl, morpholinyl, thiomorpholinyl, pyranyl, thiopyranyl, 2,3-dihydropyranyl, tetrahydropyranyl, 1,4-dihydropyridinyl, 1,4-dioxanyl, 1,3-dioxanyl, dioxanyl, homopiperidinyl, 2,3,4,7-tetrahydro-1H-azepinyl, homopiperazinyl, 1,3-dioxepanyl, 4,7-dihydro-1,3-dioxepinyl, and hexamethylene oxidyl.

In addition, heterocyclyl includes aromatic heterocyclyls or heteroaryl, for example, pyridinyl, pyrazinyl, pyrimidinyl, pyridazinyl, thienyl, furyl, furazanyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4oxadiazolyl.

Additionally, heterocyclyl encompasses polycyclic heterocyclyls (including both aromatic or non-aromatic), for example, indolyl, indolinyl, isoindolinyl, quinolinyl, tetrahydroquinolinyl, isoquinolinyl, tetrahydroisoquinolinyl, 1,4-benzodioxanyl, coumarinyl, dihydrocoumarinyl, benzofuranyl, 2,3-dihydrobenzofuranyl, isobenzofuranyl, chromenyl, chromanyl, isochromanyl, xanthenyl, phenoxathiinyl, thianthrenyl, indolizinyl, isoindolyl, indazolyl, purinyl, phthalazinyl, naphthyridinyl, quinoxalinyl, quinazolinyl, cinnolinyl, pteridinyl, phenanthridinyl, perimidinyl, phenanthrolinyl, phenazinyl, phenothiazinyl, phenoxazinyl, 1,2-benzisoxazolyl, benzothiophenyl, benzoxazolyl, benzthiazolyl, benzimidazolyl, benztriazolyl, thioxanthinyl, carbazolyl, carbolinyl, acridinyl, pyrolizidinyl, and quinolizidinyl.

In addition to the polycyclic heterocyclyls described above, heterocyclyl includes polycyclic heterocyclyls wherein the ring fusion between two or more rings includes more than one bond common to both rings and more than two atoms common to both rings. Examples of such bridged heterocycles include quinuclidinyl, diazabicyclo[2.2.1]heptyl; and 7-oxabicyclo[2.2.1]heptyl.

In the methods of the disclosure a post reactive framework agent is contacted with a MOF framework to functionally modify the framework including pore size, binding capacity (e.g., free reactive side groups, charge etc). Accordingly, the MOF frameworks can be modified for a desired purpose or use by selecting a post reactive framework agent to generate the desired porosity, charge and the like.

Figure 2:
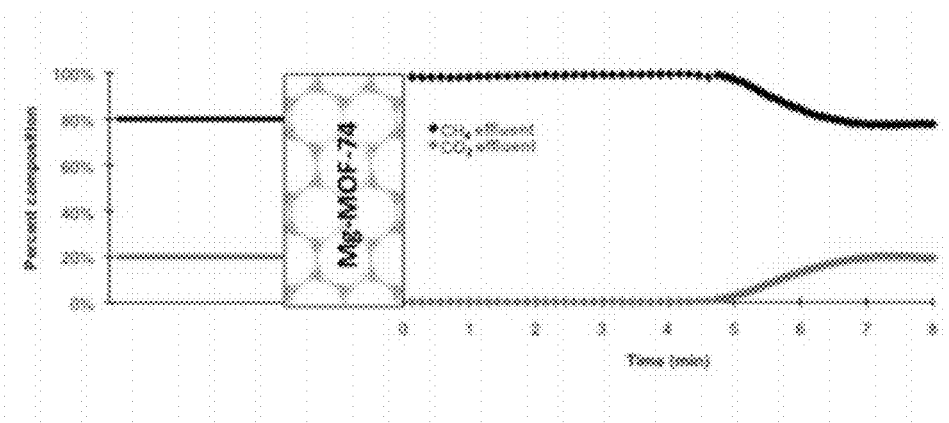
FIG. 2 is a graph depicting the effluent from a 20% mixture of $CO_2$ in $CH_4$ when fed into a bed of Mg-MOF-74. Effluent concentrations are shown, indicating complete retention of $CO_2$ until saturation.

The disclosure demonstrates the exceptional properties and utilities of these MOFs in gas separation experiments. "Breakthrough" separation experiments were performed on Mg-MOF-74 to determine its $CO_2$ separation capacity. The activated adsorbent was purged with $CH_4$ and exposed to a 10 mL min$^{-1}$ flow of a 20% mixture of $CO_2$ in $CH_4$. The effluent from the bed was monitored by mass spectrometry. The resulting "breakthrough curve" (FIG. 2) demonstrates that Mg-MOF-74 provides complete separation of $CO_2$ from the $CH_4$ stream. From these data it was calculated that Mg-MOF-74 takes up 8.9 wt. % $CO_2$ prior to breakthrough, corresponding to 0.44 molecules of $CO_2$ per magnesium ion. This equates to a volumetric capacity of 81 grams of $CO_2$ per liter of adsorbent based on a calculated density of 0.91109 g mL$^{-1}$. Because these values are obtained from breakthrough experiments, and thus reflect both the kinetic and thermodynamic aspects of separation, they provide clear evidence that Mg-MOF-74 represents a major advance in $CO_2$ separation capacity in MOFs.

Figure 3:
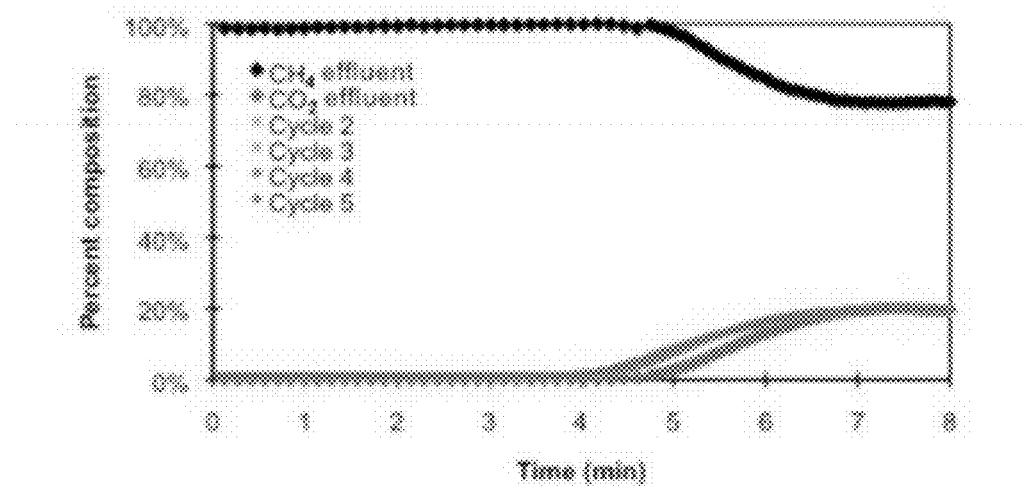
FIG. 3 shows $CO_2$ and $CH_4$ effluent from fully regenerated Mg-MOF-74 and $CO_2$ effluent for four repeat cycles after 10 min. purge at 25 mL/min.

Essential to any $CO_2$ capture material is the energy required for $CO_2$ release. Indeed, this step is a primary factor in the cost of current separation processes. To test the regeneration properties of the MOF a sample saturated with $CO_2$ was subjected to a purge flow at 25 mL min$^{-1}$ for 10 min at room temperature. Successive breakthrough experiments (FIG. 3) reveal that Mg-MOF-74 retains a capacity of 7.8 wt. % after this room temperature regeneration process, more than 87% of its intrinsic capacity. The full capacity of the MOF can be regained by purging at just 80° C. While regeneration methods in an industrial process would likely involve some combination of flow, pressure, and temperature modulation, these tests signify that Mg-MOF-74 provides high capacity separation with very mild conditions for regeneration.

The intrinsic adsorption properties of Mg-MOF-74 are not adversely affected by water vapour. After exposure to ambient atmosphere for two days, Mg-MOF-74 can be fully regenerated under nitrogen flow and elevated temperature. The MOF does not suffer from permanent loss of capacity due to reaction with water. The thermal stability of Mg-MOF-74 was tested by thermal gravimetric analysis, during which it was found to be stable above 400° C. The framework is sufficiently robust to withstand temperatures far above those encountered in separation processes, which typically do not exceed the range of 140° C.

Comparison of the separation properties of Mg-MOF-74 with standard $CO_2$ capture materials shows that this material represents a breakthrough for high capacity storage with moderate regeneration conditions. The dynamic separation capacity, initial heat of interaction, and regeneration conditions for Mg-MOF-74 and several standard materials are compared in Table 1. Mg-MOF-74 is clearly a landmark amongst MOFs such as amino-MIL-53 and ZIF-78, with a separation capacity more than twice the nearest candidate and far milder regeneration conditions. NaX zeolite is among the most effective porous adsorbents considered for $CO_2$ separation. Breakthrough experiments performed on NaX under identical conditions to those performed on Mg-MOF-74 show that the MOF material, with dynamic capacity of 8.9 wt. % $CO_2$, takes up more $CO_2$ than NaX, which has a dynamic capacity of 8.5 wt. %. Moreover, after a 10 min purge at 25 mL min$^{-1}$, NaX regains 71% of its capacity (6.4 wt. %), whereas Mg-MOF-74 regains 87% of its capacity (7.8 wt. %). The temperature required to achieve full regeneration in Mg-MOF-74 is also significantly reduced. Amongst the best porous adsorbents available for $CO_2$ separation, Mg-MOF-74 offers the best balance between separation capacity and ease of regeneration, making it a strong candidate for energy efficient $CO_2$ capture.

TABLE 1

Adsorption and separation properties of Mg-MOF-74, other MOFs, and standard $CO_2$ separation materials.

| Material | Mg-MOF-74 | NaX | 30% monoethanolamine (MEA)[13,16] | Amino-MIL-53[6] | ZIF-78[5] |
|---|---|---|---|---|---|
| Separation Capacity (wt. %)[a] | 8.9 (7.8) | 8.5 (6.4) | 13.4 | 3.7 | 1.4 |
| Initial heat of ab- or adsorption (kJ mol$^{-1}$) | 39 | 43 | 84[b] | — | 29 |
| Full Regeneration Conditions | 80° C., purge flow | 118° C., purge flow[14] | 120° C., recirculation | 159° C., purge flow | — |

[a]Values in parentheses represent capacity regained after 10 min purge at 25 mL min$^{-1}$, indicating facile regeneration in Mg-MOF-74.
[b]Value determined at 313 K.

Though a direct comparison between Mg-MOF-74 and amine solutions is difficult because the mechanism of absorption differs completely from adsorption in porous solids, amine solutions are far more widely used in industrial natural gas purification than porous adsorbents. Thus, it is necessary to make some assessment of the potential of Mg-MOF-74 relative to these solutions. A 30% monoethanolamine (MEA) solution, the most prevalent absorbent in commercial amine treatment of natural gas, takes up 13.4 wt. % $CO_2$ under typical operating conditions. Mg-MOF-74 takes up two thirds as much by comparison, but with initial heat of interaction diminished by more than a factor of two, 39 kJ mol$^{-1}$ in the MOF to 84 kJ mol$^{-1}$ in MEA. The effect of the lower heat of interaction is evident in the far milder regeneration conditions for Mg-MOF-74. As such, it is expected that removal of $CO_2$ from the MOF material will require less energy in any separation process. Needless to say, MEA solutions are toxic and highly corrosive and present an additional environmental challenge.

Also provided by the disclosure are devices for the sorptive uptake of a chemical species. The device includes a sorbent comprising a framework (e.g., Mg-MOF-74) provided herein or obtained by the methods of the disclosure. The uptake can be reversible or non-reversible. In some embodiments, the sorbent is included in discrete sorptive particles. The sorptive particles may be embedded into or fixed to a solid liquid- and/or gas-permeable three-dimensional support. In some embodiment, the sorptive particles have pores for the reversible uptake or storage of liquids or gases and wherein the sorptive particles can reversibly adsorb or absorb the liquid or gas.

In some embodiments, a device provided herein comprises a storage unit for the storage of chemical species such as ammonia, carbon dioxide, carbon monoxide, hydrogen, amines, methane, oxygen, argon, nitrogen, argon, organic dyes, polycyclic organic molecules, and combinations thereof.

Also provided are methods for the sorptive uptake of a chemical species. The method includes contacting the chemical species with a sorbent that comprises a framework provided herein (e.g., a Mg-MOF-74). The uptake of the chemical species may include storage of the chemical species. In some embodiments, the chemical species is stored under conditions suitable for use as an energy source.

Also provided are methods for the sorptive uptake of a chemical species which includes contacting the chemical species with a device provided herein.

The disclosure provides a column filtration/separation column or fixed bed comprising a MOF, IRMOF or a combination thereof capable of separating gases from other gaseous components in a multi-component gas. The retentate can be referred to as being "depleted" of the gas components. While the effluent stream can represent the desired product. In specific embodiments a gas mixture is processed using the materials and devices of the disclosure to deplete the mixture of $CO_2$.

The disclosure includes simple separation systems where a fixed bed of adsorbent (e.g., Mg-MOF-74) is exposed to a linear flow of a gas mixture. This type of setup is referred to as "fixed bed separation." However, the MOFs can be used for gas separation in more complex systems that include any number of cycles, which are numerous in the chemical engineering literature. Examples of these include pressure swing adsorption (PSA), temperature swing adsorption (TSA), a combination of those two, cycles involving low pressure desorption, and also processes where the MOF material is incorporated into a membrane and used in the numerous membrane-based methods of separation.

Pressure swing adsorption processes rely on the fact that under pressure, gases tend to be attracted to solid surfaces, or "adsorbed". The higher the pressure, the more gas is adsorbed; when the pressure is reduced, the gas is released, or desorbed. PSA processes can be used to separate gases in a mixture because different gases tend to be attracted to different solid surfaces more or less strongly. If a gas mixture such as air, for example, is passed under pressure through a vessel comprising a MOF or IRMOF of the disclosure that attracts $CO_2$ more strongly than other components of the mixed fluid gas, part or all of the $CO_2$ will stay in the bed, and the gas coming out of the vessel will be depleted in $CO_2$. When the bed reaches the end of its capacity to adsorb $CO_2$, it can be regenerated. It is then ready for another cycle of $CO_2$ separation.

Temperature swing adsorption functions similarly, however instead of the pressure being changed, the temperature is changed to adsorb or release the bound $CO_2$. Such systems can also be used with the MOF or IRMOF system of the disclosure.

The disclosure provides an apparatus and method for separating one or more components from a multi-component gas using a separation system (e.g., a fixed-bed system and the like) having a feed side and an effluent side separated by a MOF and/or IRMOF of the disclosure. The MOF and/or IRMOF may comprise a column separation format.

As used herein a multi-component fluid refers to a liquid, air or gas. The fluid may be an atmospheric gas, air or may be present in an exhaust or other by-product of a manufacturing process.

In one embodiment of the disclosure, a gas separation material comprising a MOF or IRMOF is provided. Gases that may be stored or separated by the methods, compositions and systems of the disclosure include harmful gas molecules comprising a reactive side group capable of forming a covalent, hydrogen, ionic or other bond with a functional group of a MOF or IRMOF of the disclosure. In one embodiment, the reactive side group undergoes a Lewis acid/base reaction with the corresponding acid/base. Such harmful cases can comprise a reactive pair of electrons or be acceptors of a reactive pair of electrons present on a framework of the disclosure.

The disclosure is particularly suitable for treatment of air or gas emissions containing one or more harmful gases such as, for example, ammonia, ethylene oxide, chlorine, benzene, carbon dioxide, carbon monoxide, sulfur dioxide, nitrogen oxide, dichloromethane, and tetrahydrothiophene. However, the disclosure is not limited to the foregoing gases, but rather any gas that can undergo reaction with a MOF or IRMOF of the disclosure. Particularly the MOF or IRMOF comprises a reactive side group that can bond (either covalently, ionically or through hydrogen bonds with a gas analyte). Devices comprising a MOF or IRMOF of the disclosure can be used to separate multi-component gases in a fluid comprising harmful gases. Such devices can be personnel safety devices, or devices found in emissions portions of a car, factory exhaust and the like. The compositions and methods can be used in combination with other gas removal compositions and devices including, for example, activated charcoal and the like.

Another embodiment provided by the methods and compositions of the disclosure comprises a sensor of harmful gas adsorption or absorption. As described more fully below, the disclosure demonstrates that as MOFs and IRMOFs are contact and interact with harmful gases of the disclosure the MOF and IRMOFs undergo an optically detectable change. This change can be used to measure the presence of a harmful gas or alternatively to measure the saturation of a MOF or IRMOF in a setting (e.g., in a personnel device to determine exposure or risk).

The following examples are intended to illustrate but not limit the disclosure. While they are typical of those that might be used, other procedures known to those skilled in the art may alternatively be used.

EXAMPLES

Mg-MOF-74 was synthesized and activated as follows.
In a solution of 135 mL dimethylformamide, 9 mL ethanol, and 9 mL water were dissolved 0.337 g 2,5-dihydroxyterephthalic acid and 1.4 g $Mg(NO_3)_2.6H_2O$ with sonication. The resulting stock solution was decanted into fifteen 20 mL vials, which were capped tightly and heated at 125° C. for 26 hrs. The mother liquor was then decanted, the products washed with methanol, then immersed in methanol. The products were combined and exchanged into fresh methanol daily for 4 days. They were then evacuated to dryness and heated under vacuum at 250° C. for 6 hrs. The material was stored under inert atmosphere until use.

Its structure and porosity were confirmed by powder X-ray diffraction and $N_2$ adsorption isotherm, respectively. The compound was stored in ambient atmosphere prior to use. NaX zeolite beads, 8-12 mesh, were obtained from Aldrich and were regenerated prior to use at least 250° C. under purge flow or vacuum, overnight. $N_2$, $CO_2$, and $CH_4$ gases with 99.999%, 99.995, and 99.999% purity, respectively, were obtained from Airgas ($N_2$) and Lehner & Martin Inc. ($CO_2$, $CH_4$). Nitrogen isotherms for confirmation of surface area were collected on a Quantachrome Instruments NOVA 4200e surface area and pore size analyzer. $CH_4$ and $CO_2$ isotherms were collected on Quantachrome AUTOSORB-1 automatic volumetric adsorption instrument. Breakthrough experiments were performed on a 0.4 cm×5.0 cm bed of adsorbent inside Swagelok tubing. Volume not occupied by the adsorbent bed was filled with steel beads. The flow rate and composition of the gases were determined by MKS Alta digital mass flow controllers. The pressure was held at 762 Torr by an MKS Type 640 pressure controller. The above were monitored using an MKS Type 247 4 channel readout. The gaseous effluent from the sample bed was monitored for $CO_2$, $CH_4$, $N_2$, and $O_2$ using a Hiden Analytical HPR20 mass spectrometer. The sample cell was heated for regeneration using an Omegalux HTWAT051-002 heating mantle. Powder X-ray diffraction was performed on a Bruker D8 Discover θ-2θ diffractometer in reflectance Bragg-Brentano geometry at 40 kV, 40 mA (1,600 W) for Cu K$\alpha_1$ radiation ($\lambda$=1.5406 Å).

Figure 4:
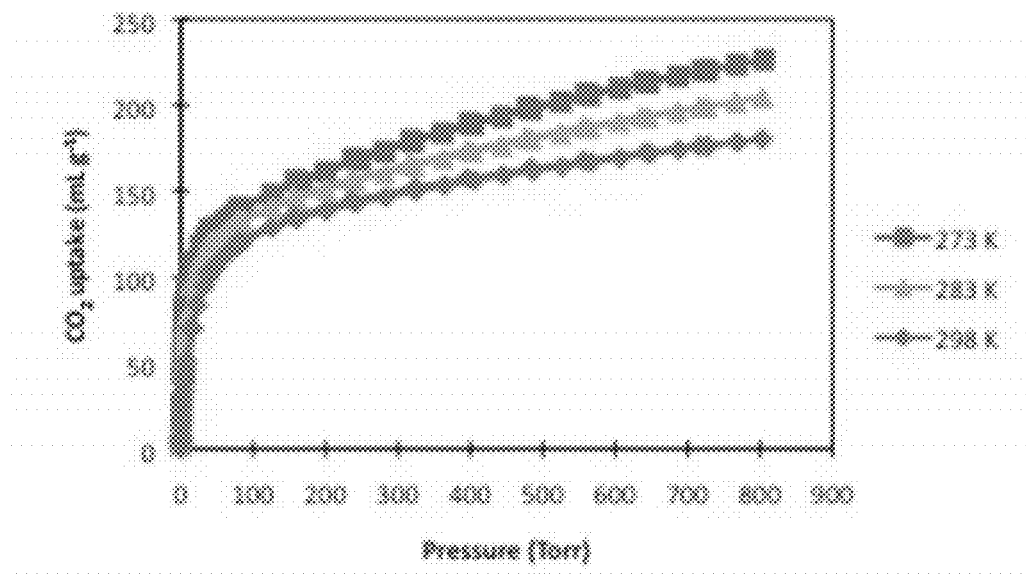
FIG. 4 shows $CO_2$ isotherms for Mg-MOF-74.
Figure 5:
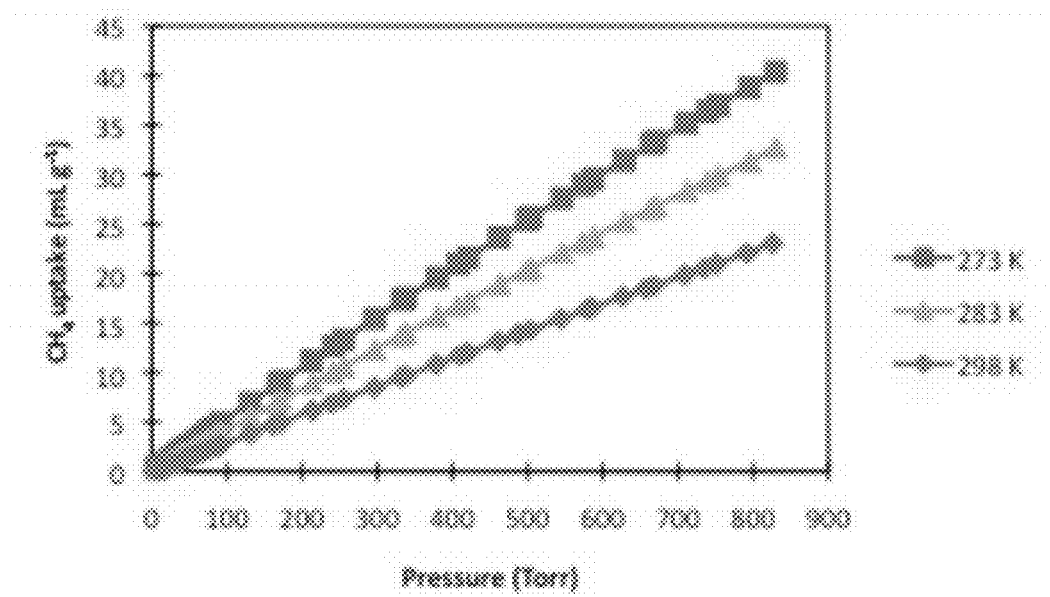
FIG. 5 shows $CH_4$ isotherms for Mg-MOF-74.

Adsorption isotherms, selectivity calculations, and heat of adsorption calculations. $CO_2$ and $CH_4$ adsorption isotherms for Mg-MOF-74 are illustrated in FIGS. 4 and 5, respectively. To estimate reliable Henry's constants, a virial-type expression comprising the temperature-independent parameters $a_i$ and $b_i$ was applied:

$$\ln P = \ln N + \frac{1}{T} \sum_{i=0}^{m} a_i N^i + \sum_{i=0}^{n} b_i N^i \quad (1)$$

where P is pressure, N is the adsorbed amount, T is temperature, and m and n represent the number of coefficients required to adequately describe the isotherms. From these results, the Henry's constant ($K_H$) is calculated from where T is temperature.

$$K_H = \exp(-b_0) \cdot \exp(-\alpha_0/T) \quad (2)$$

The Henry's Law selectivity for gas component i over j at 298 K is calculated based on eq. (3).

$$S_{ij} = K_{Hi}/K_{Hj} \quad (3)$$

Volumetric capacity calculation. Volumetric $CO_2$ separation capacity for Mg-MOF-74 was determined by using the crystal density, 0.91109 g mL$^{-1}$, as calculated from the crystal structure. The unit cell of Mg-MOF-74 contains 18 Mg atoms, 72 C atoms, 18 H atoms, and 54 O atoms. The mass of those atoms divided by the unit cell volume, 3981.5 Å$^3$, yields the crystal density. The resulting volumetric uptake value is a property of the material and should not be confused with volumetric uptake by a container filled with material. The volumetric uptake within such a container will depend on the packing density of the material, as void space between crystallites is not accounted for in this density calculation.

Figure 6:
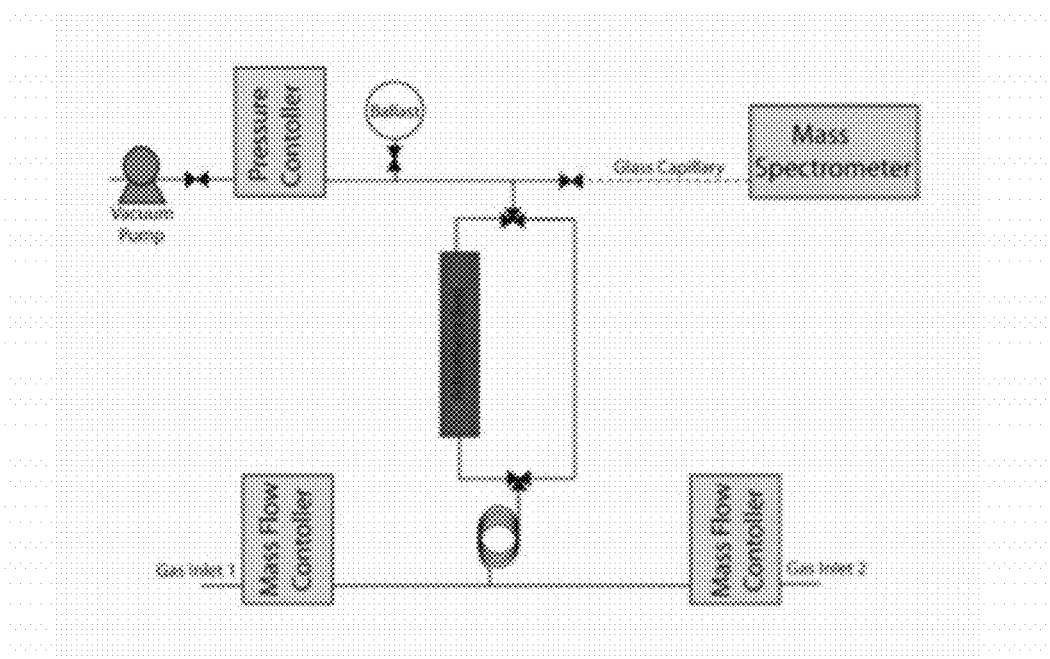
FIG. 6 depicts an apparatus used for collection of breakthrough curves.

Breakthrough separation experiments. FIG. 6 illustrates the breakthrough apparatus. In a representative breakthrough experiment, 191.4 mg Mg-MOF-74 were packed between cotton plugs in the sample cell with steel beads as necessary to fill the volume. $CH_4$ flow was set to 8.0±0.1 sccm and allowed to purge the sample. $CO_2$ flow was introduced at 2.0±0.1 sccm without modifying the $CH_4$ flow, resulting in a 20% mixture by volume. Effluent from the bed was monitored by mass spectrometry up to and for several minutes past $CO_2$ breakthrough. Breakthrough was defined arbitrarily to be 10% of the feed concentration of $CO_2$. Breakthrough times were calculated by subtracting the time to breakthrough using a sample bed packed only with steel beads from the observed breakthrough time. The separation capacity was determined by subtracting the average $CO_2$ concentration during breakthrough time from the amount of $CO_2$ fed through the bed during that time. For repetitions after room temperature purge this average was not subtracted, as this would have included $CO_2$ effluent from the previous run. The resulting error is less than 0.1 wt. % based on the parallel calculation on the first breakthrough run.

Figure 7:
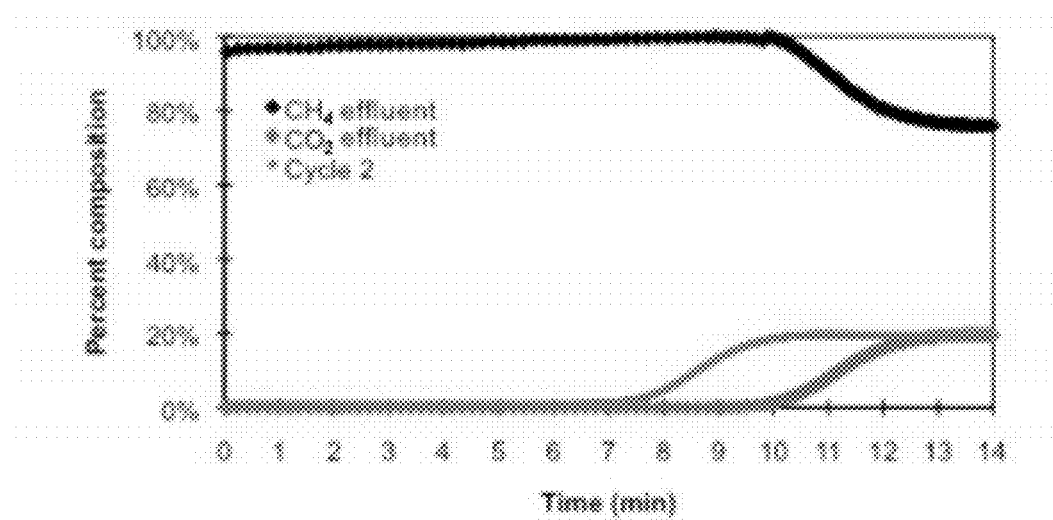
FIG. 7 shows $CO_2$ and $CH_4$ effluent from fully regenerated NaX zeolite and $CO_2$ effluent for one repeat cycle after 10 min. purge at 25 ml/min.

Breakthrough curves for $CO_2$ separation from $CH_4$ in 422.4 mg NaX zeolite are illustrated in FIG. 7. Shown are the curves for the fully regenerated material and the material after $CO_2$ saturation and subsequent room temperature purge for 10 min at 25 sccm.

A number of embodiments of the invention have been described. Nevertheless, it will be understood that various modifications may be made without departing from the spirit and scope of the invention. Accordingly, other embodiments are within the scope of the following claims.

What is claimed is:

1. A method for dynamically storing and/or separating $CO_2$ from a mixed gas stream comprising contacting a porous metal organic framework comprising Mg-MOF-74 with the mixed gas stream, wherein $CO_2$ is selectively adsorbed and/or absorbed to the framework; and wherein (A) the mixed gas stream comprises $CO_2$ and methane and/or (B) the presence of $CO_2$ can be detected by measuring a change in optical color of the framework comprising Mg-MOF-74.

2. The method of claim 1, wherein the porous metal organic framework comprising Mg-MOF-74 contains coordinately open Mg sites.

3. The method of claim 1, wherein methane comprises the largest percentage of the mixed gas stream.

4. The method of claim 1, wherein the framework can be substantially purged of absorbed $CO_2$ at room temperature or completely purged of absorbed $CO_2$ at 80° C. by subjecting the framework to a purge flow and/or pressure.

5. The method of claim 1, wherein the method comprises contacting a column or a bed of the porous metal organic framework comprising Mg-MOF-74 with the mixed gas stream.

6. The method of claim 1, further comprising contacting a least a second porous metal organic framework with the mixed gas stream, wherein the at least second porous metal organic framework gas absorption or adsorption specificity is different than the porous frameworks comprising Mg-MOF-74.

7. A device for removal of $CO_2$ gas from a mixed gas stream, the device comprising a porous metal organic framework comprising Mg-MOF-74.

8. The device of claim 7, wherein the device is a device for storing $CO_2$ and/or methane.

9. The device of claim 7, wherein the device comprises a fixed bed of Mg-MOF-74.

10. A method of detecting the presence of $CO_2$ comprising contacting a porous organic framework comprising Mg-MOF-74 with a fluid suspected of containing $CO_2$ and measuring a change in optical color of the metal organic framework by the binding of $CO_2$ to the framework.

11. The method of claim 1, wherein the method is used to adsorb $CO_2$ and transport the $CO_2$ to a different location.

12. The method of claim 1, wherein the method provides for the removal of $CO_2$ from a natural gas stream and/or the removal of $CO_2$ from flue exhaust.

13. The method of claim 1, wherein the method allows for the production of an effluent gas stream that is substantially depleted of $CO_2$.

14. The method of claim 1, wherein the framework comprising Mg-MOF-74 provides for a dynamic separation capacity of 7.8 to 8.9 wt. % $CO_2$ prior to breakthrough.

* * * * *